United States Patent [19]
Hayashi et al.

[11] Patent Number: 5,703,856
[45] Date of Patent: Dec. 30, 1997

[54] OPTICAL HEAD AND OPTICAL DATA RECORDING AND REPRODUCING APPARATUS HAVING THE SAME

[75] Inventors: Hideki Hayashi, Katano; Sadao Mizuno, Ibaraki; Noboru Ito, Hirakata; Kenichiro Urairi, Yawata; Yoshiaki Komma, Kyoto, all of Japan

[73] Assignee: Matsushita Electric Industrial Co., Ltd., Kadoma, Japan

[21] Appl. No.: 324,262

[22] Filed: Oct. 17, 1994

[30] Foreign Application Priority Data

Aug. 12, 1994 [JP] Japan .................................. 6-190462

[51] Int. Cl.[6] .................................................. G11B 7/00
[52] U.S. Cl. .................................. 369/54; 369/112
[58] Field of Search ............................ 369/112, 94, 93, 369/99, 100, 54, 58, 50, 103

[56] References Cited

U.S. PATENT DOCUMENTS 4,908,813   3/1990   Ojima et al. .................. 369/94 X
5,446,565   8/1995   Komma et al. ................. 369/103 X Primary Examiner—P. W. Huber
Attorney, Agent, or Firm—Renner, Otto, Boisselle & Sklar, P.L.L.

[57] ABSTRACT

An optical head for reproducing data from first and second optical disks which are different from each other in at least one of a base material thickness and an available wavelength, includes: a first light source for emitting a first light beam, the first light beam being used for reproducing data from the first optical disk; an optical system designed to converge the first light beam onto the first optical disk in accordance with a base material thickness and an available wavelength of the first optical disk; and a second light source for emitting a second light beam, the second light beam being used for reproducing data from the second optical disk, wherein an optical path length between the second light source and the optical system is different from an optical path length between the first light source and the optical system, and wherein the optical system converges the second light beam onto the second optical disk.

42 Claims, 22 Drawing Sheets

Wavelength dependency of reflectance of CD-R disk (example)

OPTICAL HEAD AND OPTICAL DATA RECORDING AND REPRODUCING APPARATUS HAVING THE SAME

BACKGROUND OF THE INVENTION

1. Field of the Invention:

The present invention relates to an optical head, and more particularly to an optical head capable of recording/reproducing data to and from a variety of optical disks each having a different available wavelength or a base material of different thicknesses.

2. Description of the Related Art:

A standard optical head using a laser diode (LD) is described with reference to FIG. 20. A light beam 203 output from an LD 201 is collimated by a collimate lens 202. The collimated light beam 203, which is a P-polarized light beam, is transmitted through a polarized beam splitter 204 (hereinafter, referred to as "PBS"), and then is incident onto a quarter-wave plate 205. The light beam 203 output from the quarter-wave plate 205 is, via a reflecting mirror 206, incident onto an objective lens 207. The light beam 203 is converged into an imaging point p by the objective lens 207, thus forming a beam spot 209 on the recording face of an optical disk 208. Then, a light beam 210, i.e., the light beam 203 reflected by the optical disk 208, is incident onto the objective lens 207 again. After passing though the reflecting mirror 206 and the quarter-wave plate 205 in this order, the light beam 210 is incident onto the PBS 204. At this stage, the light beam 210 has changed into an S-polarized beam by the quarter-wave plate 205 and is reflected by the PBS 204 without transmitting therethrough. The reflected light beam 210 passes through a detection lens 211 and a cylindrical lens 212, and is incident onto a photodetector (hereinafter referred to as "PD") 213. The PD 213 detects a reproducing signal based on the incident light beam 210. At the same time, the PD 213 detects a focus control signal and a tracking control by using known methods. For example, the focus control signal is obtained by an astigmatism method, and the tracking control signal is obtained by a push-pull method.

The objective lens 207 used in such an optical head is designed in consideration of the thickness of the base material of the optical disk 208 and the available wavelength thereof. This is because a wave-front aberration arises if the base material thickness or available wavelength of the optical disk 208 is different from the base material thickness or available wavelength, a factor which is considered in designing the objective lens 207, a factor which can result in failure of the recording/reproducing operation.

Conventionally, the base materials of a compact disk (hereinafter, referred to as "CD"), a video disk, an optical disk used for a magneto-optic disk drive, etc., all have been 1.2 mm in thickness. In addition, the wavelength of a light beam used for the recording/reproducing operation of such optical disks (hereinafter, referred to as "the available wavelength") has been 780 nm to 830 nm. Accordingly, as for the conventional optical disk, optical disks of various types can be recorded and reproduced by using the same optical head.

In recent years, in order to realize an optical disk with a higher recording density, attempts have been made to increase the numerical aperture of the objective lens, to use a light beam of a shorter wavelength, and the like. However, it is difficult to perform the recording/reproducing operation of the high density recording optical disk using an optical head identical with that used for the conventional optical disk.

First, by increasing the numerical aperture of the objective lens, the wider frequency band allowing the light beam to be reproduced is realized due to improvement in the optical resolution. However, in such a case, if the recording face of the optical disk 208 is inclined with respect to the plane perpendicular to the optical axis of the objective lens 207, the come of the light spot 209 increases. Thus, the increase of the numerical aperture of The objective lens does not actually improve the image forming efficiency.

In order to increase the numerical aperture of the objective lens without increasing the coma aberration, an optical disk having a thinner base material may be used. FIG. 21 is a graph showing the correlation between the thickness of the base material of the optical disk 208 and the numerical aperture of the objective lens 207. The curve in FIG. 21 is constituted by the points at which the peak value of the light intensity distribution of the light spot 209 is a predetermined value when the recording face of the optical disk 208 is inclined by 0.2° from the plane perpendicular to the optical axis of the objective lens 207.

As seen from FIG. 21, the decline of the peak value due to the inclination of the optical disk 208 in the case where the beam spot 209 is formed by the objective lens 207 with a numerical aperture of 0.5 on the optical disk whose base material is 1.2 mm thick is substantially equal to that in the case where it is formed by the objective lens 207 with a numerical aperture of 0.62 on the optical disk whose base material is 0.6 mm thick. Accordingly, even if the numerical aperture of the objective lens 207 increases, by making the base material of the optical disk thinner, the coma resulting from the inclination of the optical disk can be reduced so as to be in the same degree as the come of the conventional disk. However, when making the base material of the optical disk thinner, the wave-front aberration makes it impossible to use the same optical head to perform the recording/reproducing operations for the optical disks having the base material of 1.2 mm in thickness and those having thinner base material. That is, interchangeability between optical heads is lost. As a result, in order to perform the recording/reproducing operations for optical disks having a base material of 1.2 mm in thickness and those having a thinner base material by one optical data recording/reproducing apparatus, the optical data recording/reproducing apparatus is required to have two different optical heads, one for the optical disk of the former thickness and the other for that of the latter thickness.

Second, in the case of applying a light beam with a shorter wavelength for the recording/reproducing operation, an improved optical resolution allows the widening of the frequency band assuring the recording or reproducing operation. However, for the purpose of reproducing data from a conventional optical disk whose available wavelength is 780 nm, if a light beam of a shorter wavelength, e.g., 635 nm, is used, a reproduction signal or control signals of a sufficient level cannot be obtained due to the difference in the reflectance or absorption rate of the recording face of the optical disk. This problem is prominent, for example, when using a light beam of a short wavelength for a CD-R standardized as a writable CD.

FIG. 22 is a graph showing exemplary data representing how the reflectance of the CD-R depends on the wavelength of the light beam. The CD-R is defined as having a reflectance of 65% or more with respect to a light beam having a wavelength of 775 nm to 820 nm. However, the reflectance is extremely lowered as for a light beam having a wavelength out of this range. In some types of CD-R, the reflectance becomes as small as 5% with respect to a light beam having a wavelength of about 635 nm. Furthermore, the reproduction power of the CD-R is defined to be 0.7 mW or less. As a result, when trying to reproduce data from the CD-R having the wavelength dependency of the reflectance as shown in FIG. 22 by an optical head with an LD generating a light beam of a wavelength of 635 nm, even assuming that the reproduction power is the upper limit value of 0.7 mW and that the efficiency of a reproduction optical system is 100%, only a power of 35 μW is obtainable in the reproduction-detection system. Thus, in order to perform the recording/reproducing operation of the CD-R whose available wavelength is 780 nm by using the light beam of a wavelength of 635 nm, a signal reproducing system which has an extremely high S/N ratio is required and thus is expensive.

However, in consideration of the fabrication cost, an optical head of a widely marketed standard model is desired to have a reproduction system with an efficiency of 50% or less. Hence, it is difficult for the optical head of a standard model to assure a satisfactory reproduction S/N ratio, when using the light beam of a wavelength of 635 nm.

For these reasons, it has been very difficult to use a single optical head to perform the recording/reproducing operation for both the high-density optical disk available for a light beam of a wavelength of 635 nm and the conventional optical disk available for a light beam of a wavelength of 780 nm. Accordingly, in order to perform the recording/ reproducing operation for both the high-density optical disk and the conventional optical disk by a single optical data recording/reproducing apparatus, the apparatus has been required to separately provide the optical head using a light beam having a wavelength of 635 nm and the optical head designed for conventional optical disks. In addition, the apparatus has needed to provide optical systems respectively for both optical heads, for appropriately converging a light beam generated from each of the LDs onto the optical disk. This bulky configuration has necessitated high fabrication costs, as well as hindering the apparatus from being developed into a smaller-size.

SUMMARY OF THE INVENTION

According to one aspect of the invention, the optical head for reproducing data from first and second optical disks which are different from each other in at least one of a base material thickness and an available wavelength, includes: a first light source for emitting a first light beam, the first light beam being used for reproducing data from the first optical disk; an optical system designed to converge the first light beam onto the first optical disk in accordance with a base material thickness and an available wavelength of the first optical disk; and a second light source for emitting a second light beam, the second light beam being used for reproducing data from the second optical disk, wherein an optical path length between the second light source and the optical system is different from en optical path length between the first light source and the optical system, and wherein the optical system converges the second light beam onto the second optical disk.

According to another aspect of the invention, the optical data recording and reproducing apparatus includes an optical head for reproducing data from first and second optical disks which are different from each other in at least one of a base material thickness and an available wavelength, disk discriminating means for discriminating between the first and second optical disks, and drive means for driving the optical head based on a result of the discrimination obtained by the disk discriminating means, the optical head including: a first light source for emitting a first light beam, the first light beam being used for reproducing data from the first optical disk; an optical system designed to converge the first light beam onto the first optical disk in accordance with a base material thickness and an available wavelength of the first optical disk; and a second light source for emitting a second light beam, the second light beam being used for reproducing data from the second optical disk, wherein an optical path length between the second light source end the optical system is different from an optical path length between the first light source and the optical system, end the optical system is determined so that the second light beam is converged onto the second optical disk.

Thus, the invention described herein makes possible the advantage of providing a compact and inexpensive optical head and an optical data recording and reproducing apparatus capable of performing the recording/reproducing operation of optical disks which are different in at least one of the thickness of the base material and the available wavelength by using one optical system common to the both optical disks.

This and other advantages of the present invention will become apparent to those skilled in the art upon reading and understanding the following detailed description with reference to the accompanying figures.

DESCRIPTION OF THE PREFERRED EMBODIMENTS

Figure 1A:
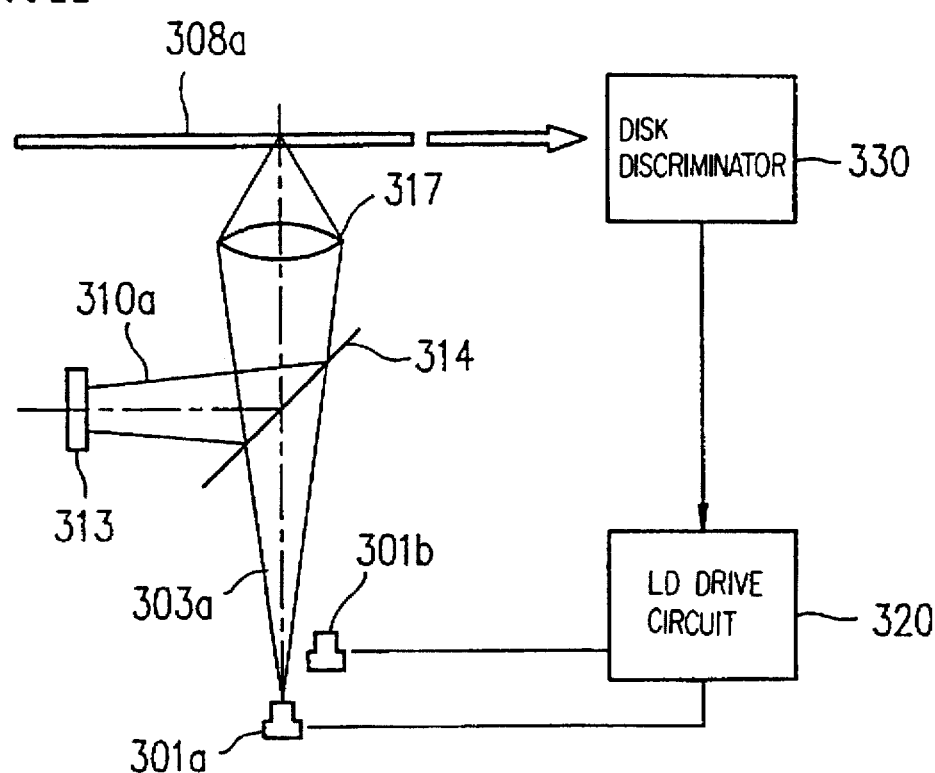
FIGS. 1A, 1B, 2A and 2B are schematic diagrams each showing the configuration of an optical head according to the present invention.
Figure 1B:
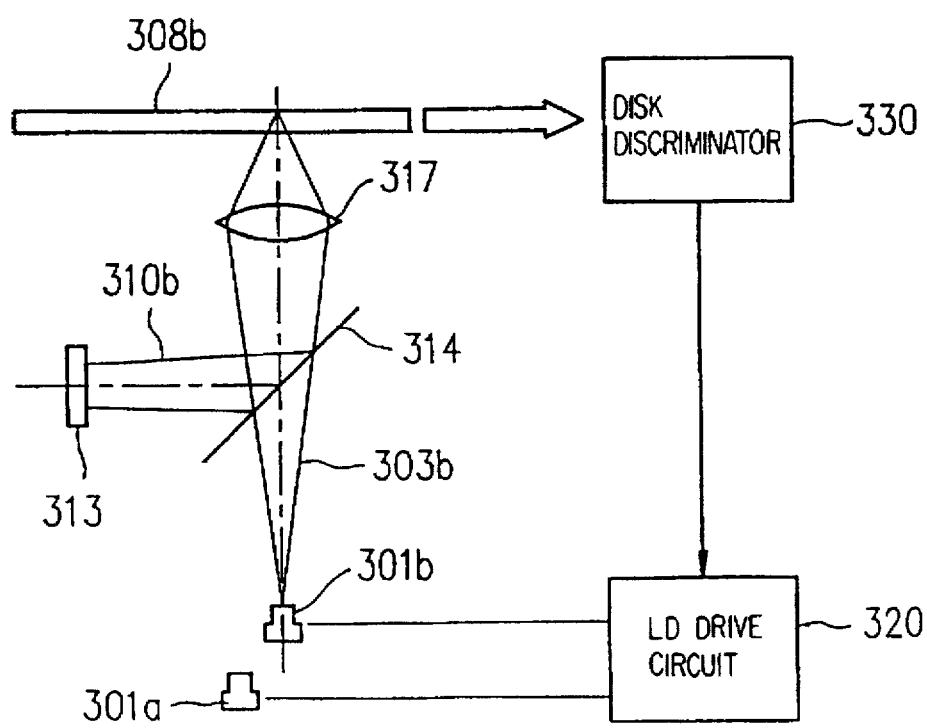

First, the present invention is described from the viewpoint of the interchangeability between optical disks each having a base material of a different thickness. FIGS. 1A and 1B are diagrams showing the schematic structure of an optical head capable of performing a recording/reproducing operation for both of an optical disk having a base material thinner than conventional ones (hereinafter, referred to as "a thin optical disk") and an optical disk having a base material of a conventional thickness (1.2 mm). Herein, it is assumed that the available wavelength of the thin optical disk and that of the optical disk of the conventional base material thickness are substantially the same.

The optical head shown in FIGS. 1A and 1B includes a laser diode (LD) 301a for the thin optical disk, an LD 301b for the optical disk having the conventional base material thickness, an LD drive circuit 320 for driving these LDs and a disk discriminator 330. When an optical disk is set in the apparatus, the disk discriminator 330 judges whether the set optical disk is the thin optical disk or the optical disk of a base material thickness of 1.2 mm. Based on the result of the judgment, the LD drive circuit 320 supplies a current to the LD corresponding to the set optical disk. In the case where the set optical disk is a thin optical disk 308a, a current is supplied to the LD 301a for a thin optical disk, as shown in FIG. 1A. The light beam 303a output from the LD 301a is focused on the thin optical disk 308a by means of a converging optical system. On the other hand, in the case where the set optical disk is an optical disk 308b whose base material is 1.2 mm thick, a current is supplied to the LD 301b for the optical disk 308b, as shown in FIG. 1B. Thus, a light beam 303b output from this LD 301b is converged on the optical disk 308b. In both cases, the light beam 303a or 303b is reflected by the optical disk 308a or 308b. By means of a half mirror or the like disposed in the optical path between the converging optical system and the LDs 301a end 301b, the optical path of the reflected light beam 310a or 310b is bent, so that the light beam 310a or 310b is incident onto a PD 313. Based on the reflected light beam 310a or 310b, the PD 313 detects a reproduction signal, a focus control signal and a tracking control signal. In the example shown in FIGS. 1A end 1B, the focus control signal is obtained by a phase difference method, and the tracking control signal is obtained by a push-pull method. The light spot on the optical disk 308a or 308b is controlled so as to follow the track on which the data to be read is receded, in accordance with these control signals.

Herein, the converging optical system is designed in accordance with the available wavelength and the base material thickness of the thin optical disk 308a. Because of this, when the light beam is converged on the optical disk 308b whose base material is 1.2 mm thick, e wavefront aberration arises on the recording face of the optical disk 308b. This wavefront aberration should be reduced to such a low level so as to be negligible in reproducing the data from the optical disk 308b. For this purpose, in the optical head of the present invention, the LD 301b for the optical disk 308b is located at a position such that the length of optical path between the LD 301b for the optical disk 308b and the converging optical system is different from that between the LD 301a for the thin optical disk 308a and the converging optical system. The process of determining the optical path length between the LD 301b for the optical disk 308b and the converging optical system will be described in detail later.

Though only one PD is provided in the apparatus shown in FIGS. 1A and 1B, in the case where a focus control signal is detected by an astigmatism method or a spot size detection (SSD) method, the PD is required to be provided in each of the LDs.

Figure 2A:
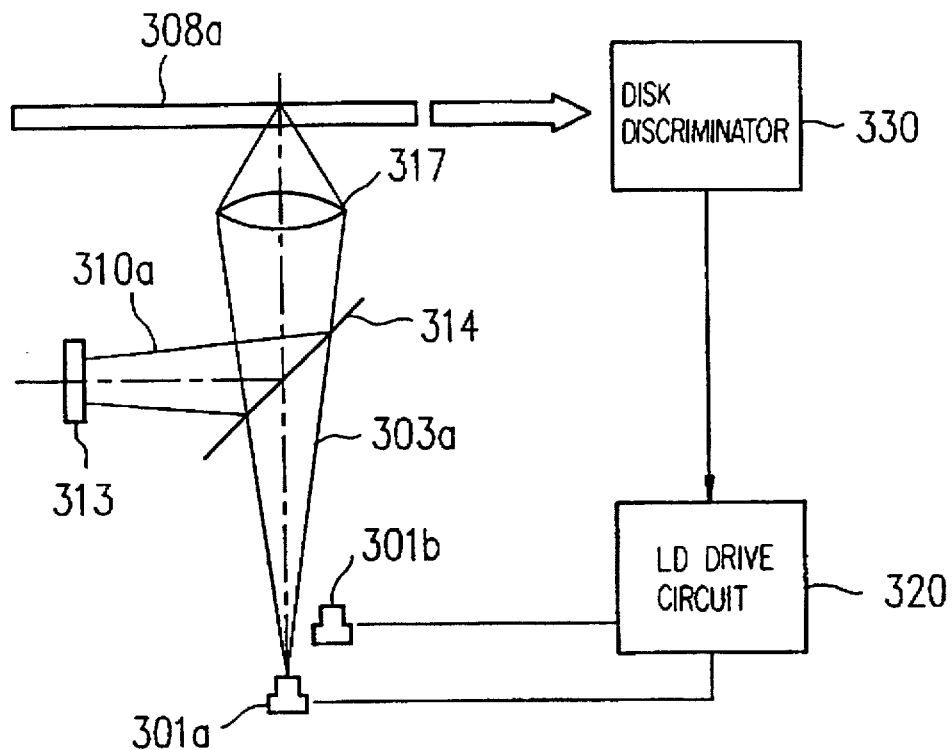
Figure 2B:
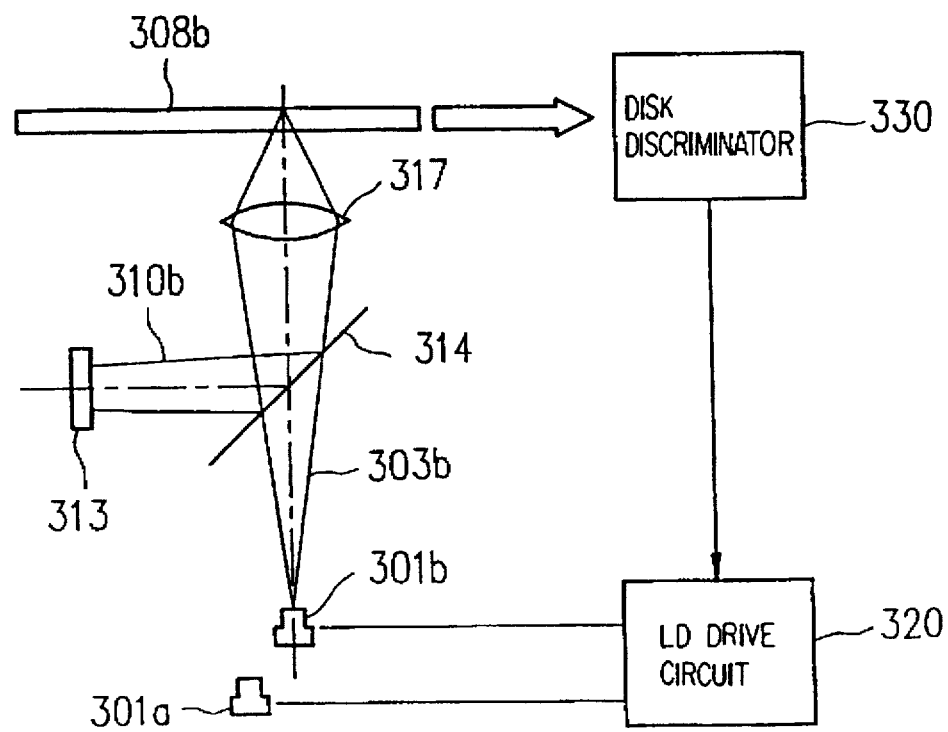

Next, with reference to FIGS. 2A and 2B, the present invention will be described from the view-point of the interchangeability be%ween optical disks whose available wavelengths are different from each other. FIGS. 2A and 2B are diagrams showing the schematic structure of an optical head of the present invention, which is capable of performing a recording/reproducing operation for both an optical disk whose available wavelength is shorter than the conventional one (hereinafter, referred to as "the short wavelength available optical disk") and a conventional optical disk (whose available wavelength is 780 nm). Herein, it is assumed that the conventional optical disk is a CD-R in which the dependence of a reflectivity on the wavelength is especially high, and that the base material thickness of the short wavelength available optical disk is the same as that of the conventional optical disk, i.e., 1.2 mm.

Similar to the optical head shown in FIGS. 1A and 1B, the optical head shown in FIGS. 2A and 2B includes a short wavelength LD 301a, a 780 nm LD 301b for the conventional optical disk 308b, an LD drive circuit 320 for driving these LDs and a disk discriminator 330. When an optical disk to be recorded or reproduced is set in the optical data recording and reproducing apparatus, the disk discriminator 330 judges whether the set optical disk is the short wavelength optical disk 308a or the conventional optical disk 308b. Based on the result of the judgment, the LD drive circuit 320 supplies a current either to the short wavelength LD 301a or the 780 nm LD 301b. In the case where the set optical disk is the optical disk 308b whose available wavelength is shorter then 780 nm, a current is supplied to the short wavelength LD 301a as shown in FIG. 2A. The output light beam 303a is focused on the short wavelength optical disk 308a by means of e converging optical system. On the other hand, in the case where the set optical disk is the CD-R 308b, a current is supplied to the 780 nm LD 301b, as shown in FIG. 2B. Then, the light beam 303b having a wavelength of 780 nm is focused on the CD-R 308b. In both cases, the light beam 303a or 303b is reflected by the optical disk 308a or 308b. The reflected beam 310a or 310b passes through a converging optical system, and then, by means of a half mirror or the like disposed between the converging optical system and the LDs 301a and 301b, the reflected beam 310a or 310b is turned to a PD 313. Finally, the light beam is incident onto the PD 313. The PD 313 detects a reproduction signal, a focus control signal and a tracking control signal based on the reflected light beam 310a or 310b. In the example shown in FIGS. 2A and 2B, the focus control signal is detected by a phase difference method, and the tracking control signal by a push-pull method. By using these control signals, a control for making the light spot on the optical disk 308a or 308b follow the track is performed.

Herein, the converging optical system is designed in accordance with the available wavelength and base material thickness of the short wavelength optical disk 308a. Because of this, if the light beam 301b having a wavelength of 780 nm is converged on the CD-R 308b, a wavefront aberration arises on the recording face of the CD-R 308b. Thus, in the optical head of the present invention, the above-mentioned wavefront aberration on the recording face of the CDR 308b is compensated for by making the optical path length between the 780 nm LD 301b and the converging optical system different from that between the short wavelength LD 301a and the converging optical system. In this way, the wavefront aberration on the recording face of the CD-R 308b can be reduced to such a low level so as to be negligible in reproducing data from the CD-R.

In the foregoing, the case where the optical disks are different in the base material thickness and the case where the optical disks are different in the available wavelength have been discussed separately from each other. However, the present invention can be applied also to the case where the optical disks are different both in the base material thickness and the available wavelength. Also in this case, a converging optical system is designed in accordance with the base material and the available wavelength of a first optical disk (for example, an optical disk having a thin base material), and the LD for a second optical disk is disposed so that the optical path between the LD for the second optical disk and the converging optical system is different from that between the LD for the first optical disk and the converging optical system. This arrangement makes it possible to reproduce data from both the first and second optical disks which are different from each other both in the base material thickness and in the available wavelength.

Hereinafter, the manner of determining the optical path length between the converging optical system, designed in accordance with the base material thickness and the available wavelength Of one optical disk (the first optical disk), and the LD for the other optical disk (the second optical disk) will be described.

The converging optical system is designed to appropriately converge the light beam 303a on the recording face of the first optical disk 308a, in accordance with the base material thickness and the available wavelength of the first optical disk 308a. Herein, the light beam 303a is so converged as to make the wavefront aberration on the recording face of the first optical disk 308a 10 mλ (rms) or less. The optical path length between the LD 301b for the second optical disk 308b and the thus designed converging optical system is determined so as to minimize the wavefront aberration arising when the light beam 303b output from the LD 301b is converged onto the recording face of the second optical disk 308b by the converging optical system.

For example, the case where the base material thickness and the available wavelength of the first optical disk 308a are 0.6 mm and 635 nm, respectively will be explained hereinafter. The base material thickness and the available wavelength of the second optical disk 308b are 1.2 mm and 780 nm, respectively. The converging optical system includes a collimate lens (not shown) and the objective lens 317, and is designed to converge the light beam 303a from the LD 301a on the first optical disk 308a with a wavefront aberration of 10 mλ (rms) or less. In this case, the focal length of the collimate lens (not shown) and that of the objective lens 317 are 3 mm and 25 mm, respectively.

Figure 3A:
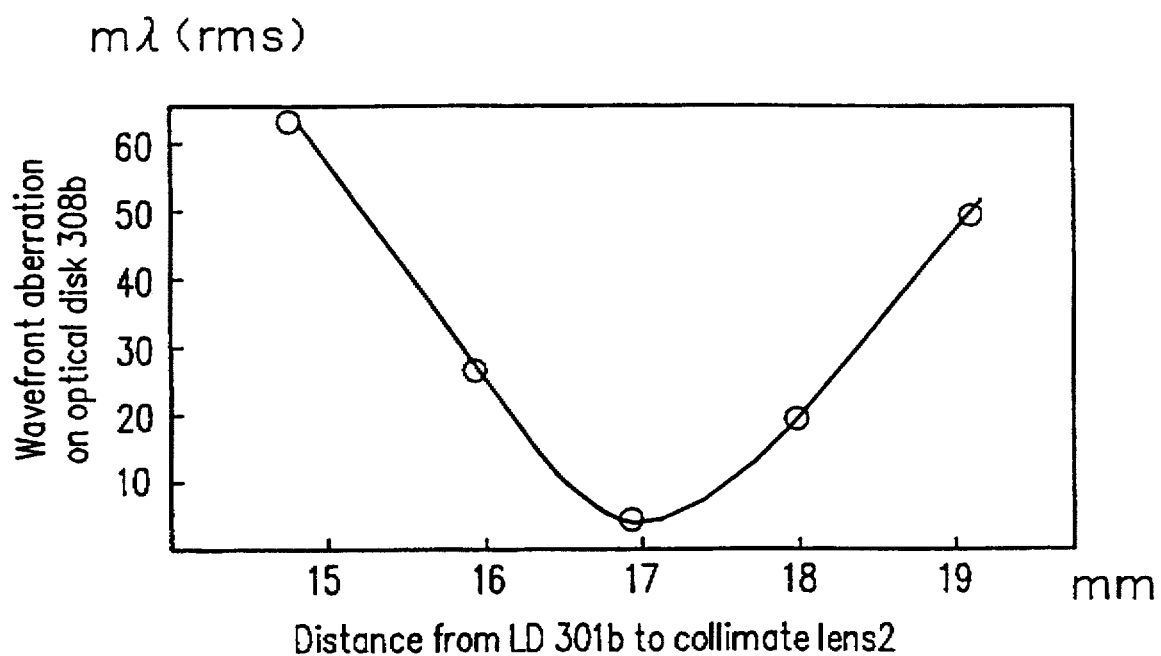
FIGS. 3A and 3B are graphs each showing the relationship between the distance from an LD and a collimate lens and a wavefront aberration.

FIG. 3A shows the relationship between the optical path length between the LD 301b for the second optical disk 308b and the thus designed converging optical system and the wavefront aberration arising when the light beam 303b output from the LD 301b is converged onto the recording face of the second optical disk 308b whose base material thickness is 1.2 mm. As is apparent from this graph, the wavefront aberration records its minimum value, less then 10 mλ (rms), when the optical path length between the LD 301b and the collimate lens in the converging optical system is about 17 mm. Accordingly, when the LD 301b is disposed at a position such that the distance to the collimate lens becomes 17 mm, the reproducing operation of the second optical disk 308b can be performed without any problem, even if using the converging optical system designed in accordance with the base material thickness and the available wavelength of the first optical disk 308a.

Next, the determination of the optical path length between the converging optical system and each of the LDs in the case where the first optical disk 308a and the second optical disk 308b have the same base material thickness and have different available wavelengths is explained. The available wavelengths of the first and second optical disks 308a and 308b are 635 nm and 780 nm, respectively. The converging optical system including the collimate lens and the objective lens 317 is designed to converge the light beam 303a having a wavelength of 635 nm on the first optical disk 308a with a wavefront aberration of 10 mλ (rms) or less. The focal length of the collimate lens and the objective lens are set to be 3.7 mm and 22.5 mm, respectively.

Figure 3B:
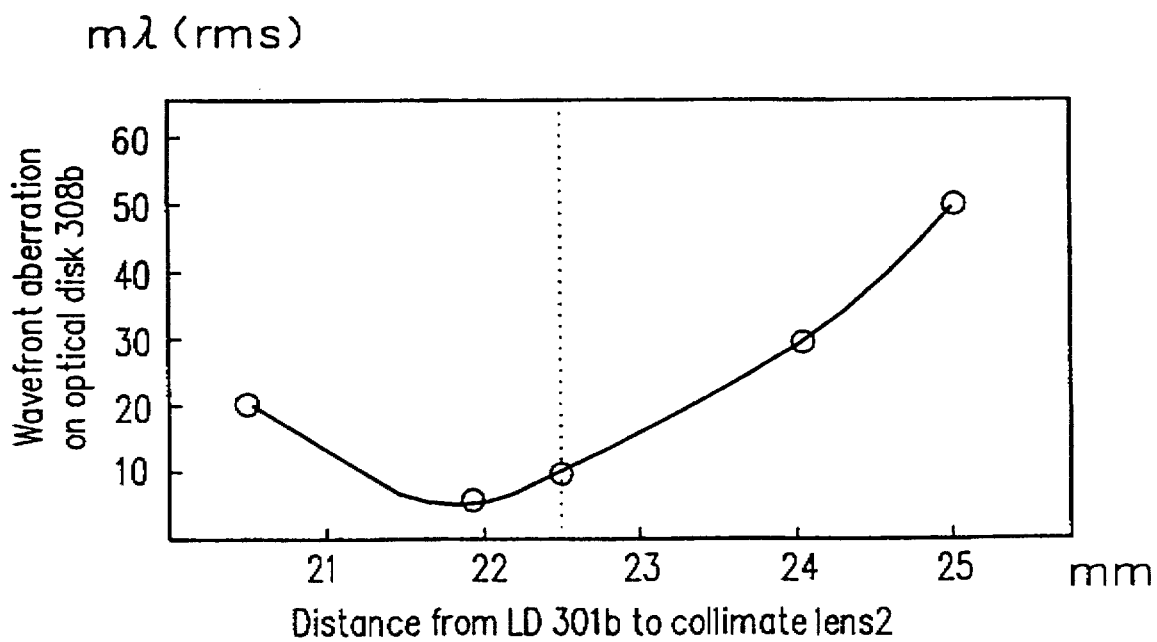

FIG. 3B shows the relationship between the optical path length between the second LD 301b and the thus designed converging optical system and the wavefront aberration arising when the light beam 303b output from the LD 301b is converged onto the second optical disk 308b. As is apparent from this graph, the wavefront aberration records its minimum value, less than 10 mλ (rms), when the optical path length between the LD 301b and the collimate lens in the converging optical system is about 21.8 mm. Accordingly, when the LD 301b is disposed at a position such that the distance therefrom to the collimate lens becomes 21.8 mm, the reproducing operation of the second optical disk 308b can be performed without any problem, even if using the converging optical system designed in accordance with the base material thickness and the available wavelength of the first optical disk 308a.

In the foregoing, the manner of determining the optical path length between the second LD and the converging optical system has been described, with respect to the case where the first end second optical disks are different both in the base material thickness and the available wavelength, and the case where they have the same base material thickness but are different in the available wavelength. However, also in the case where they have the same available wavelength but are different in the base material thickness, the optical path length between the LD for the second optical disk end the converging optical system is determined in a similar manner.

With reference to FIGS. 1A through 2B, a general concept of the optical head according to the present invention has been described. However, the optical head is actually configured in different ways depending on the various combinations of the base material thickness and the available wavelength between the first and second optical disks. The actual configurations of the optical head will be described hereinafter, with reference to accompanying drawings.

EXAMPLE 1

Figure 4:
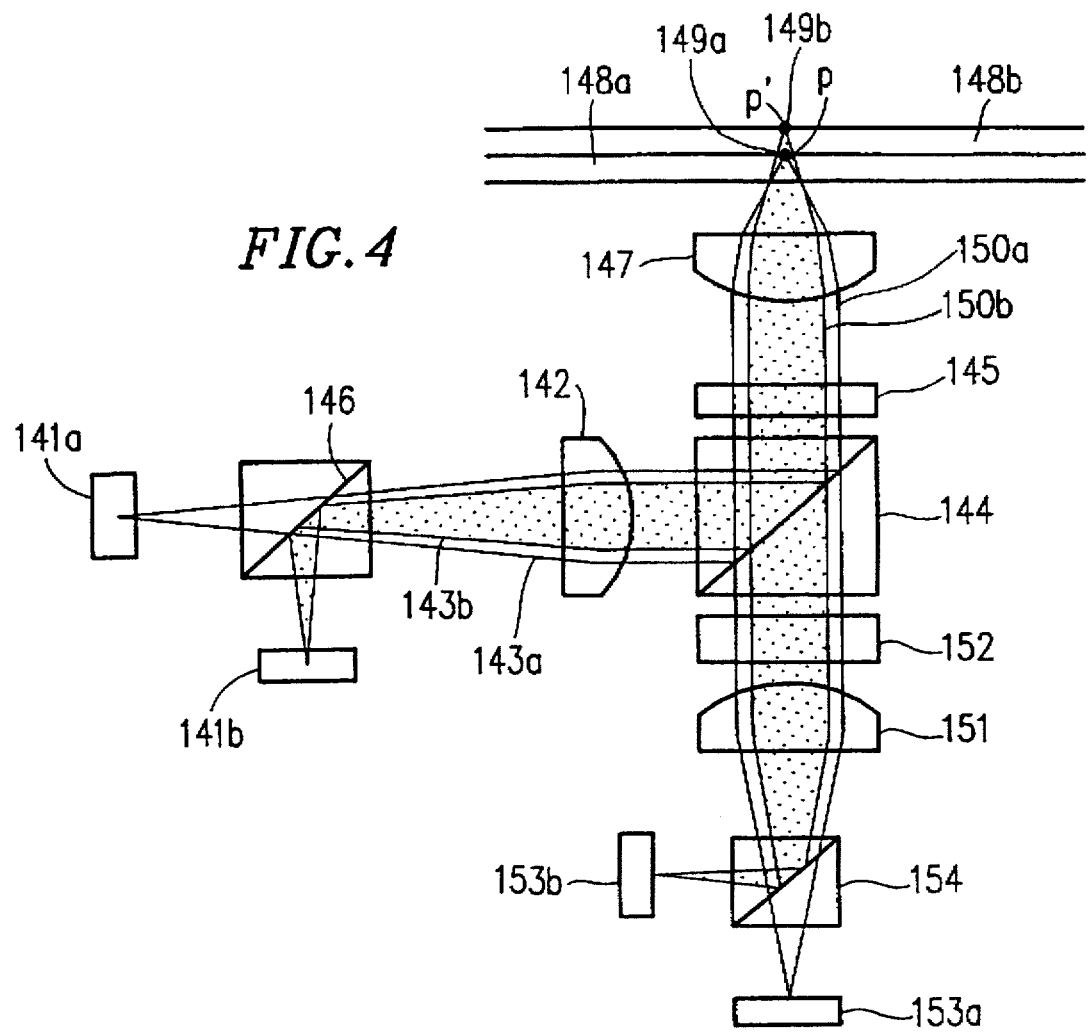
FIG. 4 is a side view showing a first example of the present invention.

Now, Example 1 of the present invention will be described with reference to FIG. 4. In Example 1, the first optical disk 148a and the second optical disk 148b are different from each other both in the base material thickness and the available wavelength. FIG. 4 shows the configuration of an optical head including an LD 141a for a thin optical disk 148a and an LD 141b for a conventional optical disk, i.e., an LD which emits light of 780 nm. Herein, the conventional optical disk 148b is a compact disk (CD), and the available wavelength of the thin optical disk 148a is shorter than that of the CD.

In FIG. 4, a light beam 143a output from an LD 141a for a thin optical disk passes through a half mirror 146 and is collimated by a collimate lens 142. The light beam 143a output from the LD 141a is an S-polarized beam. After being collimated, the light. beam 143a is reflected by a polarization beam splitter (hereinafter, referred to as "PBS") 144. Subsequently, the light beam 143a is converted into a circularly polarized beam by passing through a quarter-wave plate 145, and is incident on an objective lens 147. The objective lens 147 converges the light beam 143a into an imaging point p on the recording face of a thin optical disk 148a. Thus, a beam spot 149a is formed on the recording face of the thin optical disk 148a.

Following this, a light beam 150a, which is the light beam 143a reflected by the optical disk 148a, repasses through the objective lens 147 and the quarter-wave plate 145 in this order. At this time, the light beam 150a is incident on the PBS 144. The light beam 150a transmits through the PBS 144, since it has been converted into a P-polarized beam by the function of the quarter-wave plate 145. The light beam 150a transmitted through the PBS 144 is, via a cylindrical lens 152 and a diaphragm lens 151, incident onto a wavelength selecting mirror 154. As the wavelength selecting mirror 154, this optical head provides such an element as transmitting the light beam output from the LD 141a for a thin optical disk and reflecting the light beam output from the LD 141b for a CD, i.e., the light beam of a wavelength of 780 nm. Accordingly, the reflected light beam 150a transmits through the wavelength selecting mirror 154 and is incident on a PD 153a for a thin optical disk. The PD 153a is configured so as to detect a focus control signal end a tracking control signal by an astigmatism method and a push-pull method, respectively, as well as a reproduction signal.

Next, the case where the optical disk set in the optical head shown in FIG. 4 is a CD will be described. A light beam 143b having a wavelength of 780 nm is output from an LD 141b for a CD. Herein, the light beam 143b output from the LD 141b is an S-polarized beam. The optical path of the light beam 143b is turned by the half mirror 146, so that the light beam 143b is incident onto the collimate lens 142. The light beam 143b, substantially collimated by the collimate lens 142, is reflected by the PBS 144. Subsequently, the light beam 143b is converted into a circularly polarized beam by passing through the quarter-wave plate 145, and thereafter is incident on the objective lens 147. The objective lens 147 converges the light beam 143b into an imaging spot p' on the recording face of the CD 148b. Thus, a beam spot 149b is formed on the recording face of the CD 148b.

Following this, a light beam 150b, which is the light beam 143b reflected by the optical disk 148a, repasses through the objective lens 147 and the quarter-wave plate 145 in this order, and is incident on the PBS 144. At this time, the light beam 150b transmits through the PBS 144, since it has been converted into a P-polarized beam by the function of the quarter-wave plate 145. The light beam 150b transmitted through the PBS 144 passes through the cylindrical lens 152 and the diaphragm lens 151, and is incident onto a wavelength selecting mirror 154. As described above, the wavelength selecting mirror 154 reflects the light beam of a wavelength of 780 nm. The light beam 150b reflected by the wavelength selecting mirror 154 is incident onto a PD 153b for a CD. Similar to the above-mentioned PD 153a for a thin optical disk, the PD 153b detects a focus control signal and a tracking control signal by an astigmatism method and a push-pull method, respectively, as well as a reproduction signal.

In the configuration as shown in FIG. 4, each of the optical components of the converging optical system between the half mirror 146 and the objective lens 147, as well as the cylindrical lens 152 end the diaphragm lens 151 are designed in accordance with the base material thickness and the available wavelength of the thin optical disk 148a. Hence, in order to correct a wavefront aberration occurring when the light beam 143b of a wavelength of 780 nm is focused on the CD 148b by the thus designed optical components, the optical head of Example 1 is arranged so that optical path length between the LD 141b for a CD and the half mirror 146 is different from the optical path length between the LD 141a for a thin optical disk and the half mirror 146, as described above with reference to FIG. 3A. As a result, the degree in which the light beam 143b converges on the recording face of the CD 148b can be improved to a level sufficiently high enough for reproducing data from the CD.

In the above-described optical head, the available wavelength of the thin optical disk 148a and that of the CD 148b are different. The present invention can be applied also to the case where they are the same wavelength. However, in the case where the available wavelength of the thin optical disk 148a and that of the CD 148b are the same, that is, the case where both of the available wavelengths are 780 nm, a half mirror is used in place of the wavelength selecting mirror 154.

Figure 5:
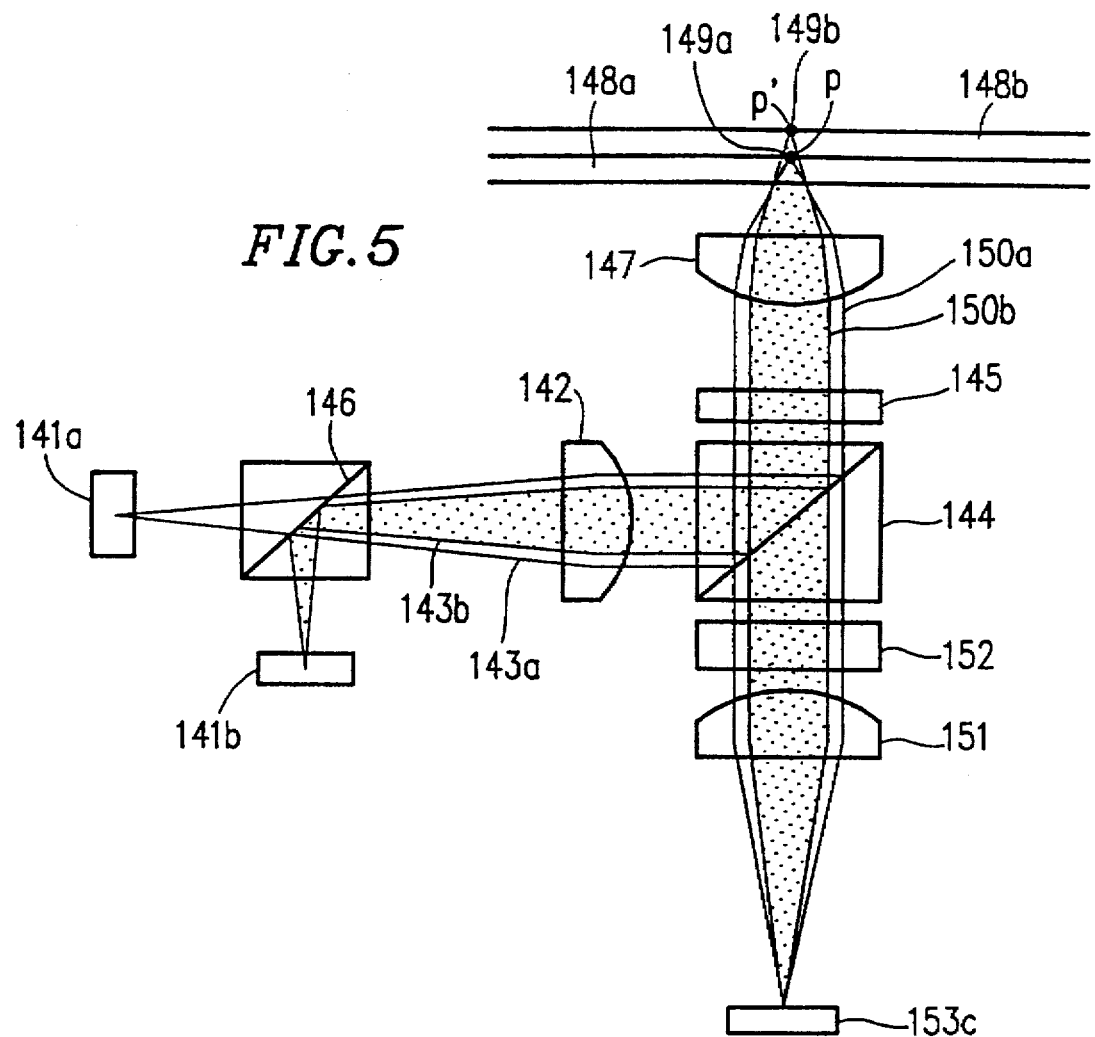
FIG. 5 is a side view showing a modification of the first example of the present invention.

Furthermore, in the optical head shown in FIG. 4, in the case of detecting a focus control signal by a phase difference method, there is no necessity of providing one PD for each of the LDs. Instead, it is sufficient to remove the wavelength selecting mirror 154 and provide one PD 153c, as shown in FIG. 5. However, in such a case, a signal obtained from the PD 153c should be subjected to an appropriate correcting processing by a signal processing circuit (not shown).

EXAMPLE 2

Now, Example 2 of the present invention is described with reference to FIG. 6. In Example 2, the base material thickness of a first optical disk 168a is different from that of a second optical disk 168b. The first optical disk and the second optical disk are a thin optical disk and a conventional optical disk, respectively. Similar to the optical heads shown in FIGS. 4 and 5, an optical head shown in FIG. 6 includes an LD 161a for the thin optical disk 168a and an LD 161b for the conventional optical disk 168b, i.e., a 780 nm LD. In this example, the conventional disk 168b is a CD.

First, the case where the optical disk set in the optical head is a thin optical disk 168a will be described hereinafter. A light beam 163a output from the LD 161a is incident onto a PBS 166. The LD 161a outputs a P-polarized beam as the light beam 163a. Accordingly, the light beam 163a transmits through the PBS 166 and is incident on a collimate lens 162. The light beam 163a collimated by the collimate lens 162 is incident on a half mirror 164. Then, the component of the light beam 163a, reflected by the half mirror 164, are incident on an objective lens 167. The light beam incident on the objective lens 167 is converged into an imaging point p on the recording face of the thin optical disk 168a. Thus, a beam spot 169a is formed on the recording face of the thin optical disk 168a.

Thereafter, a light beam 170a, i.e., the light beam reflected by the optical disk 168a, repasses through the objective lens 167 and is incident on the half mirror 164. The component transmitting through the half mirror 164 passes through a cylindrical lens 172, a focusing lens 171 and another PBS 174 in this order, to be incident onto a PD 173a for a thin optical disk 168a. The PD 173a is configured so as to detect a focus control signal and a tracking control signal by an astigmatism method and a push-pull method, respectively, as well as a reproduction signal.

On the other hand, in the case where the optical disk set in the optical head is the CD 168b, a light beam 163b is output from an LD 161b for a CD. This LD 161b is disposed so as to output a linearly polarized beam whose polarization direction is substantially perpendicular to that of the light beam 163a from the LD 161a. That is, the LD 161b for the CD 168b outputs an S-polarized beam as the light beam 163b. The light beam 163b passes through a cover glass 175, and then is incident onto the PBS 166. The cover glass 175 is disposed between the PBS 166 and the LD 161b so as to correct the optical path length from the PBS 166 to the LD 161b. Since the light beam 163b is the S-polarized beam, it is reflected by the PBS 166 and is incident onto the collimate lens 162. The light beam 163b, substantially collimated by the collimate lens 162, is incident on the half mirror 164. Then, the component of the light beam 163b, reflected by the half mirror 164, is incident on an objective lens 167. The objective lens 167 converges the light beam into an imaging point p' on the recording face of the CD 168b. Thus, a beam spot 169a is formed on the recording face of the CD 168b.

Thereafter, a light beam 170b, which is the light beam reflected by the optical disk 169a, repasses through the objective lens 167 and is incident on the half mirror 164. The component transmitting through the half mirror 164 pass through the cylindrical lens 172 and the focusing lens 171 in this order, to be incident onto the PSS 174. Since being an S-polarized beam, the light beam 170b is reflected by the PBS 174, and is incident onto a PD 173b for the CD 168b. The PD 173b is configured so as to detect the focus control signal and the tracking control signal by the astigmatism method and the push-pull method respectively, as well as the reproduction signal.

Figure 6:
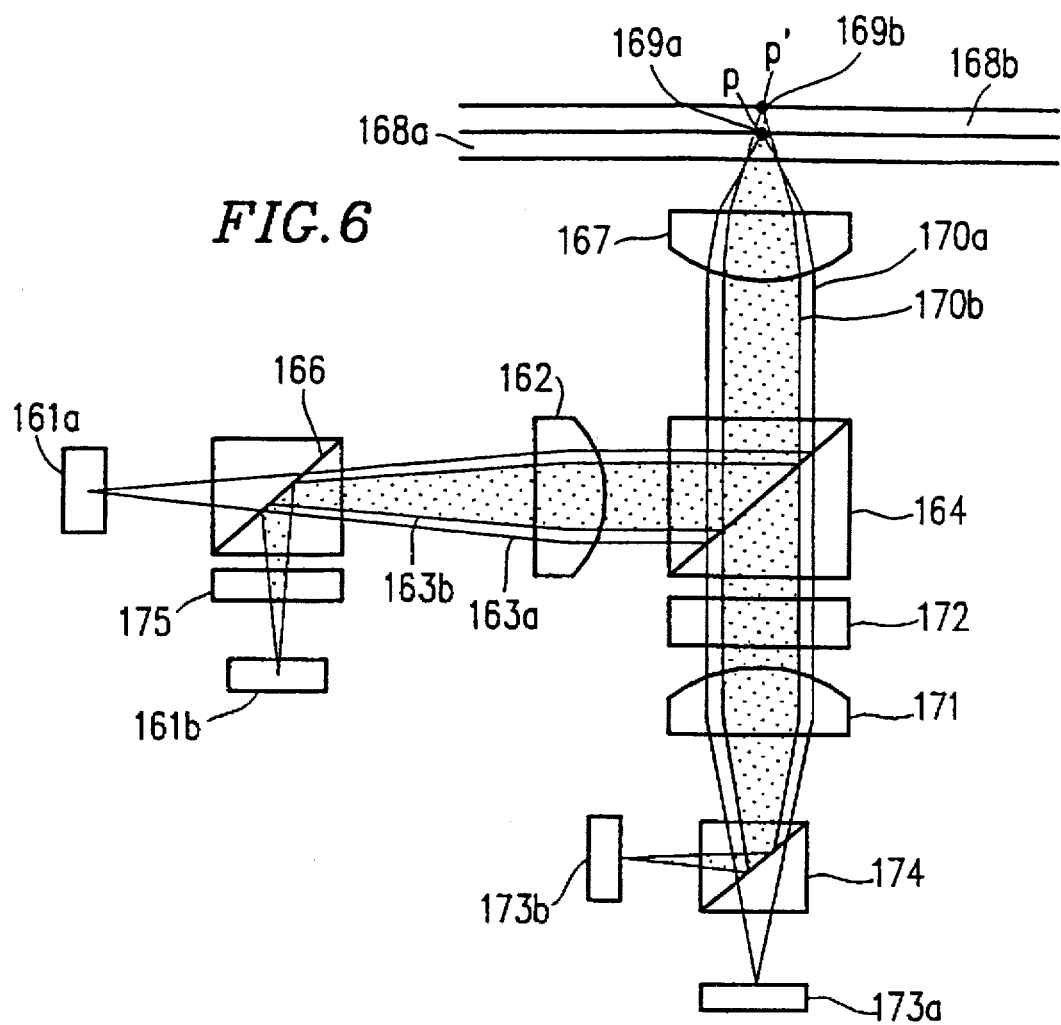
FIG. 6 is a side view showing a second example of the present invention.

Also in the configuration shown in FIG. 6, each of the optical components of the optical system is designed in accordance with the base material thickness and the available wavelength of the thin optical disk 168a. Hence, in Example 2, the cover glass 175 for correcting the optical path length is provided on the optical path between the LD 161b for the CD 168b and the PBS 166, and thereby the optical path length between the LD 161b for the CD 168b and the PBS 166 is different from the optical path length between the LD 161a for the thin optical disk 168a and the PBS 166. The optical path lengths are determined in such a way as discussed above with reference to FIGS. 3A and 3B. In this way, it becomes possible to compensate for the wavefront aberration which occurs when the light beam 163b of a wavelength suitable for a conventional optical disk, i.e., 780 nm, is focused on the CD 168b by using the thus designed optical components. As a result, the degree in which the light beam 163b is converged on the recording face of the CD 168b can be improved so as to be sufficient for reproducing data from the CD 168b.

EXAMPLE 3

Now, Example 3 of the present invention is described with reference to FIG. 7. In Example 3, similar to the above-mentioned Example 2, the base material thickness of the first optical disk 188a is different from that of the second optical disk 188b. The available wavelengths of the first optical disk 188a and the second optical disk 188b may be the same or different. Similar to the optical heads shown in FIGS. 4 through 6, an optical head shown in FIG. 7 includes an LD 181a for the thin optical disk 188a and an LD 181b for the conventional optical disk 188b, i.e., an LD which emits a light beam having a wavelength of 780 nm. In this example, the conventional optical disk 188b is a CD.

First, the case where a set optical disk is the thin optical disk 188a will be described hereinafter. A light beam 183a output from the LD 181a for the thin optical disk 188a is reflected by a first face of a half mirror 188, and is incident onto a collimate lens 182. At this time, the LD 181a has output an S-polarized beam as the light beam 183a. After collimated by the collimate lens 182, the light beam 183a is converged into an imaging point p on the recording face of a thin optical disk 188a. Thus, a beam spot 189a is formed on the recording face of the thin optical disk 188a.

Thereafter, a light beam 190a, i.e., the light beam 183a reflected by the optical disk 188a, repasses through the objective lens 187 and the collimate lens 182, to be incident on the half mirror 186. The half mirror 186 has a second face serving as a polarized beam splitter, in addition to the above-mentioned first face. After passing through the first face of the half mirror 186, the reflected light beam 190a is reflected by the second face and is incident onto a PD 193a for the thin optical disk 188a. The PD 193a is configured so as to detect the focus control signal and the tracking control signal by the astigmatism method and the push-pull method, respectively, as well as the reproduction signal.

Next, the case where the set optical disk is the CD 188b will be described. The LD 181b for the CD 188b outputs a linearly polarized beam whose polarization direction is substantially perpendicular to that of the light beam 183a. In other words, the light beam 183b is a P-polarized beam. As shown in FIG. 7, the LD 181b for the CD 188b is located on the optical axis so as to be closer to the half mirror 186 than the LD 181a for the thin optical disk 188a. Furthermore, the LDs 181a and 181b are adjacent with each other in he direction perpendicular to the optical axis. The light beam 183b is reflected by the first face of the half mirror 186 and is incident onto a collimate lens 182. The light beam 183b substantially collimated by the collimate lens 182 is converged into an imaging point p' on the recording face of the CD 188b. Thus, a beam spot 189b is formed on the recording face of the CD 188b.

Following this, a light beam 190b, which is the light beam 190a reflected by the optical disk 188b, repasses through the objective lens 187 and the collimate lens 182 to be incident onto the half mirror 186. Since the reflected light beam 190b is a P-polarized beam, it passes through both the first face end the second face of the half mirror 186 to be incident onto a PD 193b for the CD 188b. The PD 193b is configured so as to detect the focus control signal and the tracking control signal by the astigmatism method and the push-pull method, respectively, as well as the reproduction signal.

Figure 7:
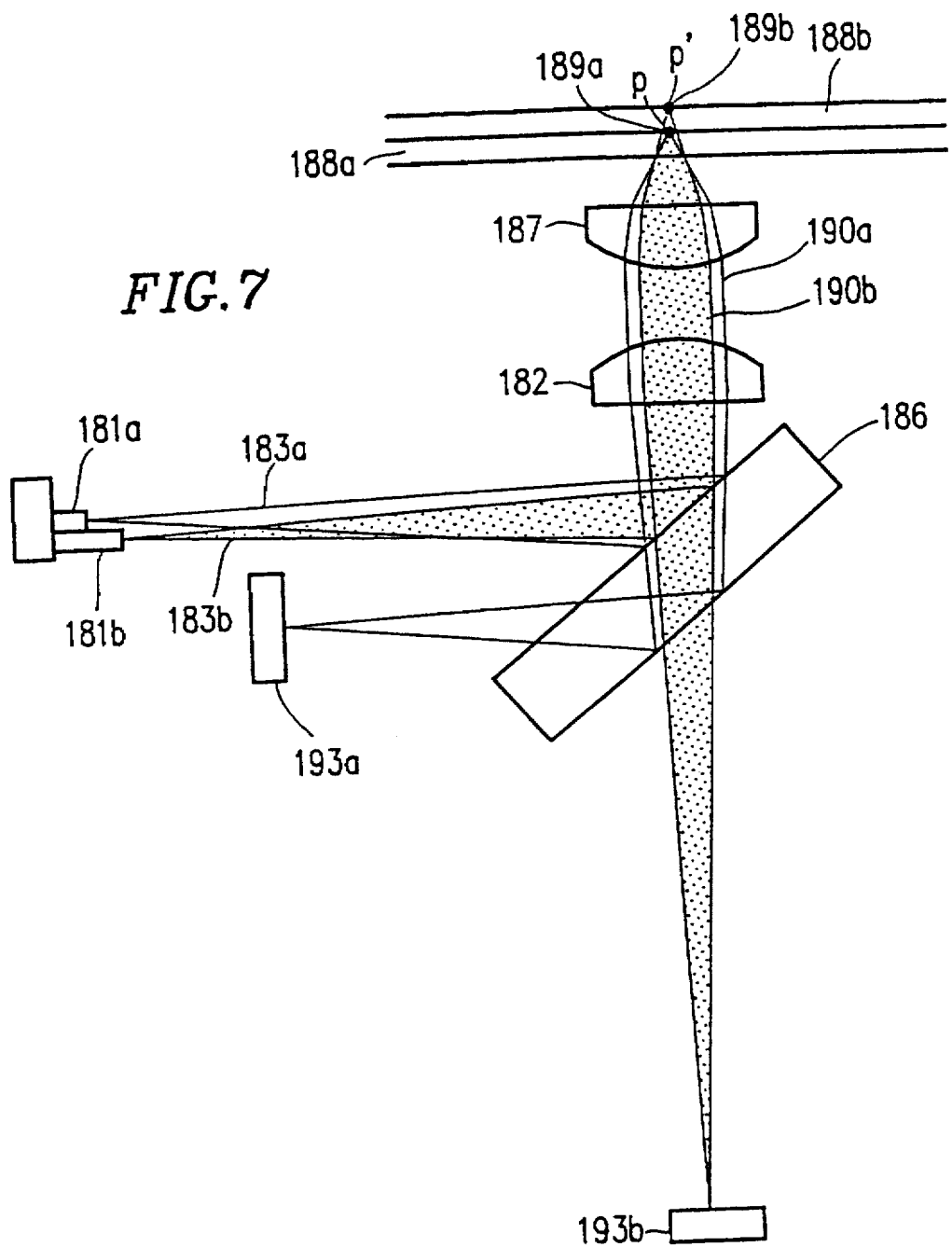
FIG. 7 is a side view showing a third example of the present invention.

Also in the configuration shown in FIG. 7, the collimate lens 182 and the objective lens 187 are designed in accordance with the base material thickness and the available wavelength of the thin optical disk 188a. Hence, in Example 3, by locating the LD 181b for the CD 188b so as to be closer to the half mirror 186 than the LD 181a for the thin optical disk 188a, it is arranged that the optical path length between the LD 181b for the CD 188b and the half mirror 186 and the optical path length between the LD 181a for the thin optical disk 188a and the half mirror 186 are different from each other. The optical path lengths are determined in such a way as discussed above with reference to FIGS. 3A and 3B. This arrangement makes it possible to compensate for the wavefront aberration which occurs when the light beam 183b of a wavelength suitable for a conventional optical disk, i.e., 780 nm, is focused on the CD 188b. As a result, the degree in which the light beam 183 is converged on the recording face of the CD 188b can be improved to an extent sufficient for reproducing data from the CD 188b.

EXAMPLE 4

Now, Example 4 of the present invention is described with reference to FIGS. 8A and 8B. Example 4, the first optical disk 8a and the second optical disk 8b are different both in the base material thickness and the available wavelength. Similar to the optical heads shown in FIGS. 3 through 6, an optical head shown in FIG. 8A and 8B includes an LD 1a for the first optical disk 8a and an LD 1b for the second optical disk 8b. In this example, the first optical disk 8a is an optical disk whose base material is 0.6 mm thick and whose available wavelength is 635 nm, while the second optical disk 8b is a conventional optical disk whose base material is 1.2 mm thick and whose available wavelength is 780 nm. In addition, the recording density of data on the first optical disk 8a is higher than that on the conventional disk 8b. Hereinafter, an optical disk on which the recording density is higher than conventional one is simply referred to as a high-density optical disk.

Figure 9A:
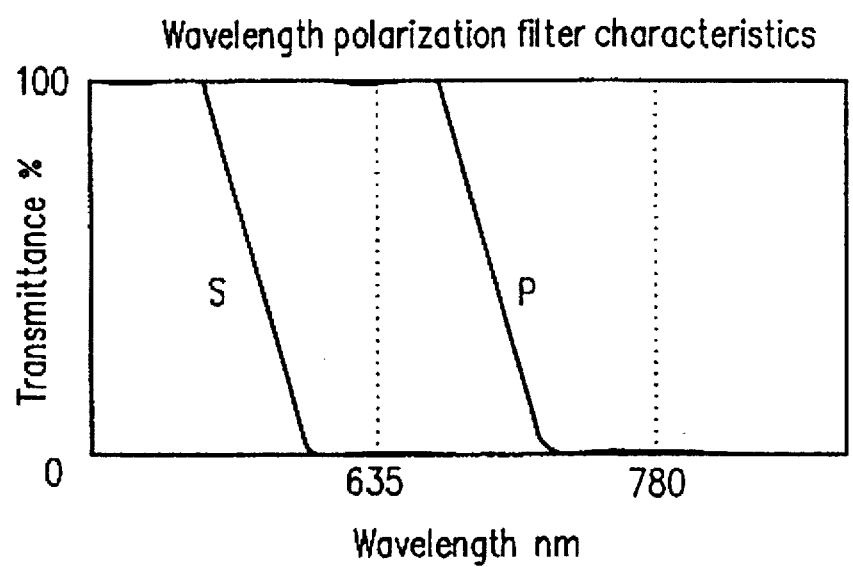
FIGS. 9A and 9B are diagrams each showing the relationship between the transmittance and the wavelength of the wavelength polarization filter.

First, the case where the optical disk inserted is the high-density optical disk 8a will be described hereinafter. A light beam 3a output from the LD 1a for the high-density optical disk 8a is incident onto a first wavelength polarization filter 4a. Herein, the LD 1a outputs a P-polarized beam as the light beam 3a. The first wavelength polarization filter 4a is used for combining the optical path of the light beam 3a and that of a light beam 3b from the LD 1b for the optical disk 8b as described later, and has characteristics as shown in FIG. 9A. Therefore, the light beam 3a transmits through the wavelength polarization filter 4a and then is incident onto a collimate lens 2. The light beam 3a collimated by the collimate lens 2 is incident onto a second wavelength polarization filter 4a'. The second wavelength polarization filter 4a' also has characteristics as shown in FIG. 9A, and is arranged so that it is spatially twisted at 90° with respect to the first wavelength polarization filter 4a. Because of this, the light beam 3a is incident onto a second wavelength polarization filter 4a', as an S-polarized beam. Thus, the light beam 3a is reflected by this filter 4a' and is incident onto a wave plate 25. The wave plate 25 is designed so that a phase difference of π/2 arises with respect to the light beam having a wavelength of 635 nm. Thus, the light beam 3a is converted into a circularly polarized beam by passing through the wave plate 25. The circularly polarized light is converged into an imaging point p on the recording face of the high-density optical disk 8a by an objective lens 7. Thus, a beam spot is formed on the recording face of the high-density optical disk 8a whose base material is 0.6 mm thick.

Thereafter, a light beam 10a, which is the light beam 3a reflected by the optical disk 8a, repasses through the objective lens 7 and the wave plate 25 in this order, to be incident on the second wavelength polarization filter 4a'. The light beam 10a transmits through the second wavelength polarization filter 4a', since it has been converted into a P-polarized beam by the function of the wave plate 25. Then, the light beam 10a passes through a detection lens 11 and is incident on a PD 13a for the first optical disk 8a. The PD 13a detects the focus control signal and the tracking control signal by the astigmatism method and the push-pull method, respectively, as well as the reproduction signal.

Figure 15:
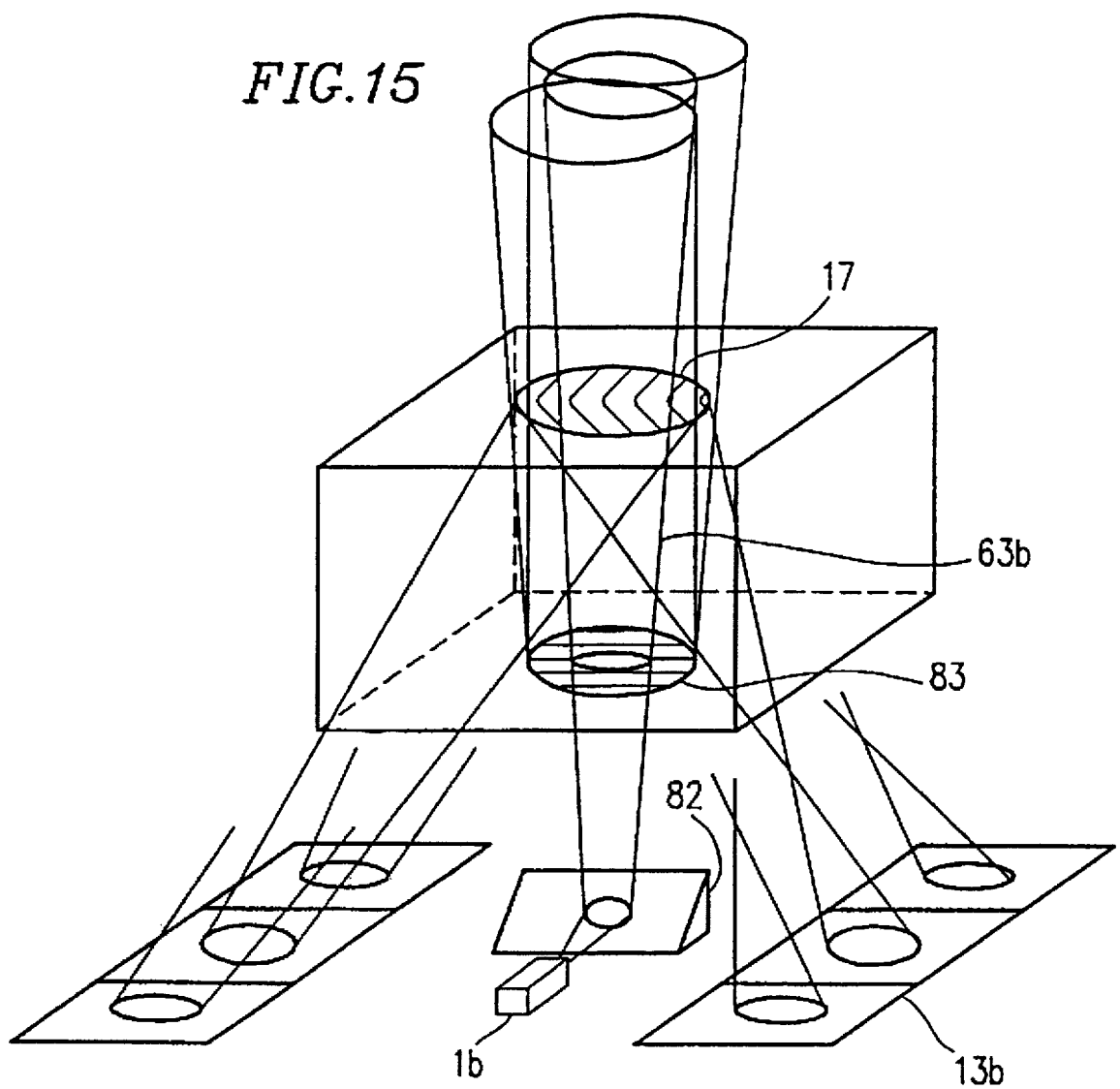
FIG. 15 is a diagram schematically showing the configuration of a laser-detector integrated module.

Next, the case where the inserted optical disk is the conventional optical disk 8b such as a CD, whose base material is 1.2 mm thick, will be described. The LD 1b for the optical disk 8b outputs a light beam 3b. The optical head of Example 4 provides a laser diode-photodetector integrated module 14, in which the LD 1b, a PD 13b and a hologram 17 are integrated as one unit. The configuration of this LD-PD integrated module is shown in FIG. 15, and will be described later. The hologram 17 is used for splitting the light beam reflected by the optical disk 8b into a plurality of beams and spatially changing these beams. The thus arranged module 14 has an advantage in that it can be installed on a base face of the optical head only by adjusting the rotation of sub-beams for the detection of the tracking control signal. In some cases, no adjustment is required. This is because the relative positional relationship between the PD 13b and the hologram 17 is adjusted in the assembly process of the LD-PD integrated module 14. In addition, though the hologram 17 of Example 4 is provided for splitting the reflected light beam into a plurality of beams, it may be replaced with a prism.

Figure 8A:
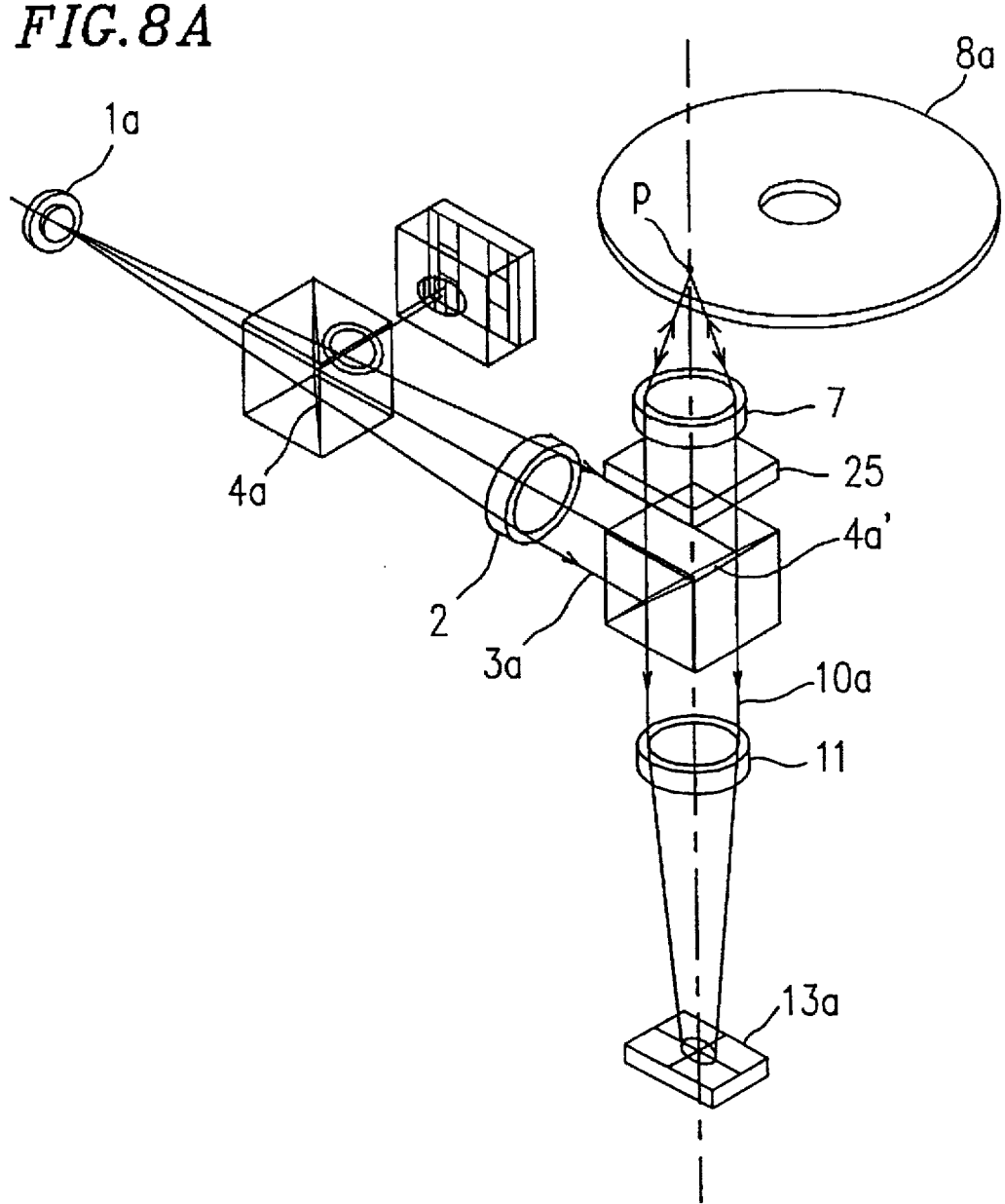
FIGS. 8A and 8B are side views each showing a fourth example of the present invention.
Figure 8B:
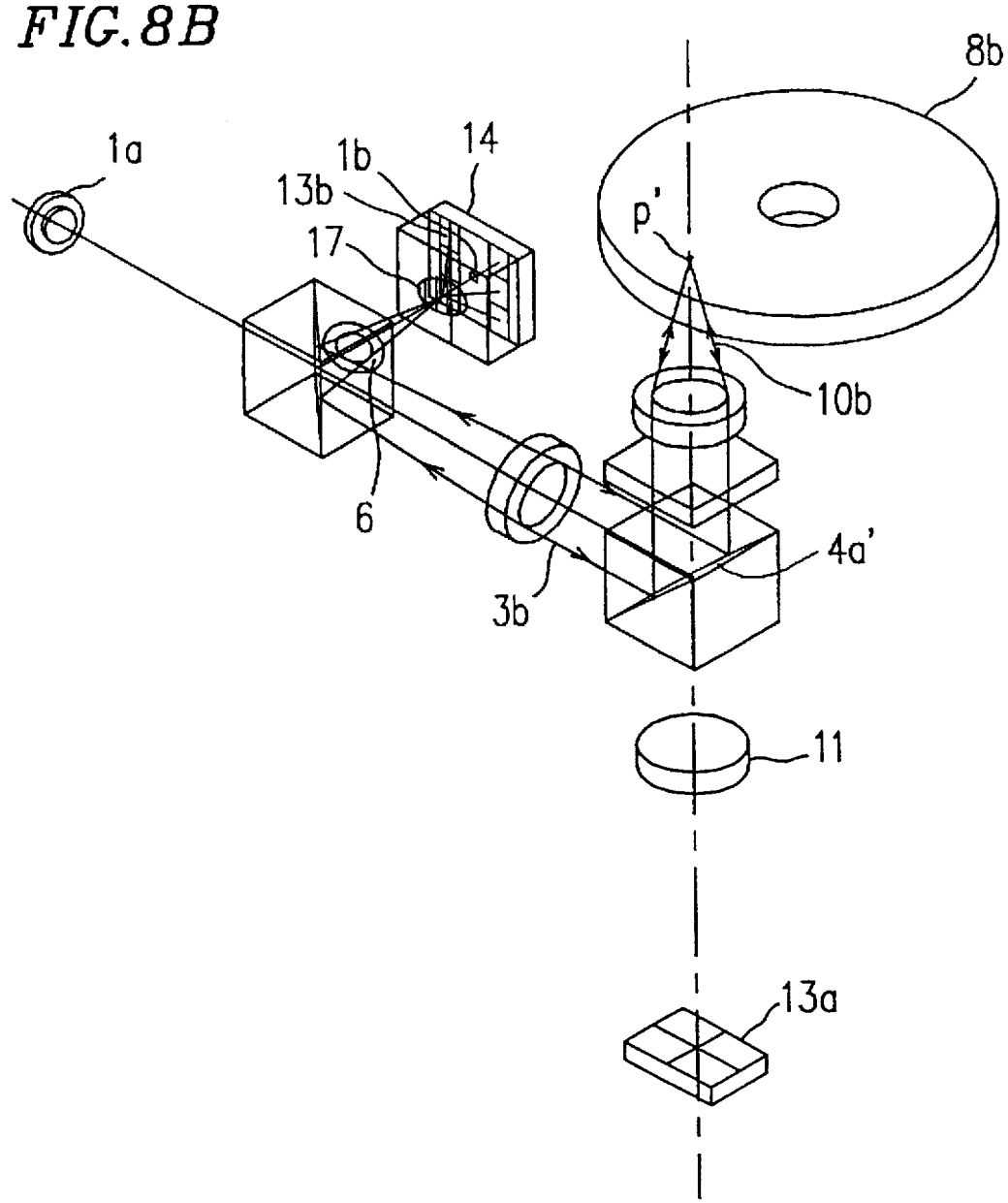

As shown in FIG. 8B, passing through an aperture 6, the light beam 3b output from the LD 1b of the LD-PD module 14 is incident onto the first wavelength polarization filter 4a. The aperture 6 limits the beam radius of the light beam 3b so as to form a beam spot having the optimum radius for reproducing data from the conventional optical disk 8b whose base material is 1.2 mm thick. Since the first wavelength polarization filter 4a has transmittance-wavelength characteristics as shown in FIG. 9A, the light beam 3b is reflected by the first wavelength polarization filter 4a regardless of its polarization, and is incident on the collimate lens 2. The collimate lens 2 has been designed in accordance with the base material thickness and the available wavelength of the above-mentioned high-density optical disk 8a. Accordingly, the light beam 3b passed through the collimate lens 2 does not become a completely collimated beam but a beam a little more scattered than the shove-mentioned collimated light beam 3a. In succession, the light beam 3b is incident onto the second wavelength polarization filter 4a' and is reflected at almost 100% irrespective of its polarization. The light beam 3b reflected by the second wavelength polarization filter 4a' passes through the wave plate 25 and is converged into an imaging point p' on the recording face of the optical disk 8b by the objective lens 7. Thus, a beam spot is formed on the recording face of the optical disk 8b whose base material is 1.2 mm thick.

Thereafter, a light beam 10b, which is the light beam 3b reflected by the optical disk 8b, repasses through the objective lens 7 end the wave plate to be incident on the second wavelength polarization filter 4a'. The polarization of this light beam 10b has been changed due to the function of the wave plate 25. However, since the wavelength of the light beam 10b is 780 nm, it is reflected at almost 100% by the second filter 4a' irrespective of its polarization. Thereafter, the light beam 10b passes through the collimate lens 2, and is reflected at almost 100% also by the first wavelength polarization filter 4a. The reflected beam is incident onto the LD-PD integrated module 14. The incident light beam 10b is diffracted by the hologram 17 formed on the front face of the module 14 to be incident onto the PD 13b, which is configured so as to detect the focus control signal by the spot size detection (SSD) method and the tracking control signal by the three-beam method. By using tracking signal, a control for making the beam spot on the recording face of the optical disk 85 follow the reading track is performed.

In Example 4, the collimate lens 2, the objective lens 7 and the like have been designed in accordance with the thickness of the base material (0.6 mm) and the available wavelength (635 nm) of the thin high-density optical disk 8a. As a result, the wavefront aberration arises when the light beam 3b having a wavelength of 780 nm is converged, by the thus designed optical system, on the recording face of the optical disk 8b whose base material is 1.2 mm thick. For sufficiently reducing this wavefront aberration, the distance between the LD 1b and the collimate lens 2 is set so as to be different from that between the LD 1a and the collimate lens 2. Specifically, the optical path lengths are determined as described above with reference to FIG. 3A.

Figure 10:
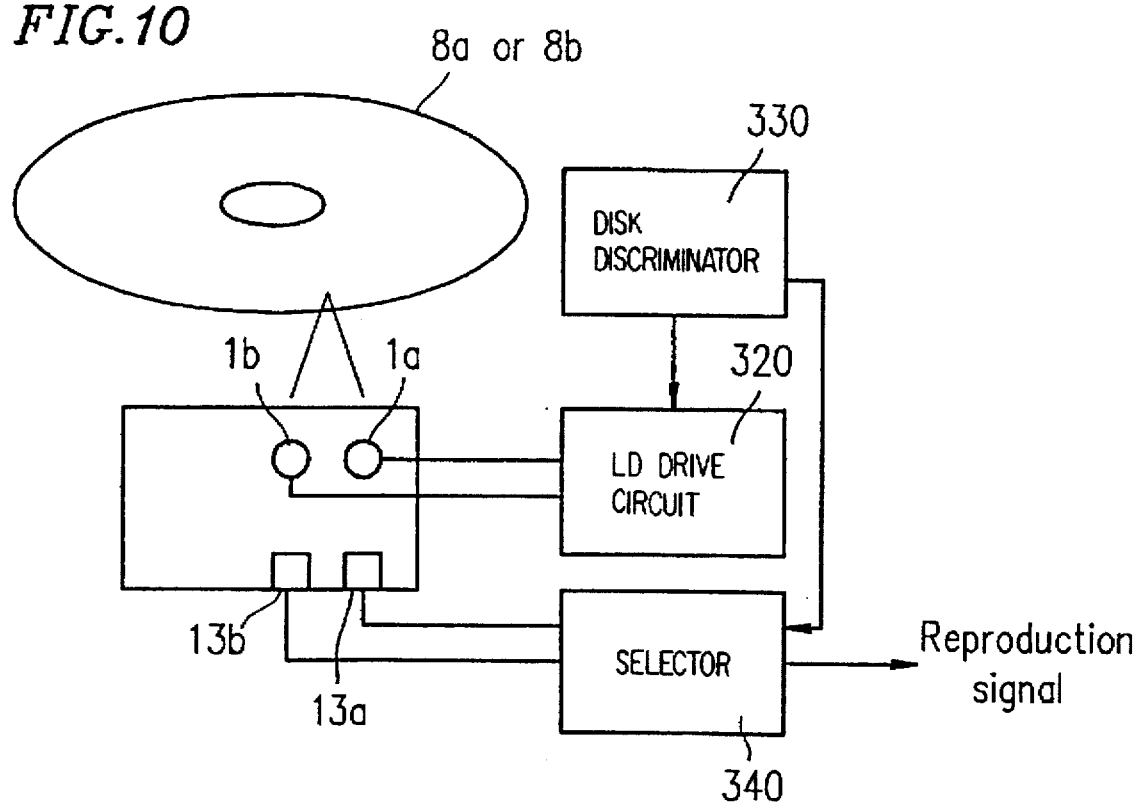
FIG. 10 is a block diagram showing an optical head of the fourth example of the present invention.

FIG. 10 shows a system block diagram of the optical data recording/reproducing apparatus including the optical head of Example 4. When an optical disk is inserted into the apparatus, based on the shape of a cartridge of the optical disk or the like, a disk discriminator 330 judges whether it is the thin high-density optical disk 8a whose base material is 0.6 mm thick or the conventional optical disk 8b whose base material is 1.2 mm thick. In the case where the optical disk is judged to be the high-density optical disk 8a whose base material is 0.6 mm thick, an LD drive circuit 320 supplies a current to the LD 1a, so that the light beam 3a having a wavelength of 635 nm is output. The light beam 3a reflected by the optical disk 8a is incident onto the PD 13a. The control signals and the reproduction signal are obtained based on the reflected light beam. Meanwhile, in the case where the optical disk is judged to be the optical disk 8b whose base material is 1.2 mm thick, the LD 1b is driven by a current from the LD drive circuit 320, so that the light beam 3b having a wavelength of 780 nm is output. The light beam 3b reflected by the optical disk 8b is incident onto the PD 13b, and the control signals and the reproduction signal are obtained by using the light beam incident onto the PD 13b.

In the configuration as shown in FIGS. 8A and 8B, the wavelength polarization filter 4a having characteristics as shown in FIG. 9A is employed. Hence, the wave plate 25 only functions as an isolator solely for the light beam 3a of a wavelength of 635 nm, while there is no necessity for providing an isolator for the light beam 3b of a wavelength of 780 nm. Thus, this system can be fabricated using inexpensive components. In addition, since the first and second wavelength polarization filters 4a and 4a' are of the same design, the optical head can be fabricated at a low cost. Furthermore, it is possible to minimize the number of reflecting planes by which the light beam 3a of a wavelength of 635 nm is reflected on the optical path from the LD 1a to the imaging point p on the recording face of the high-density optical disk 8a, resulting in an improved accuracy of the wavefront aberration at the imaging point p. Thus, good reproduction characteristics can be obtained.

In this Example 4, in order to combine the optical path of the light beam 3a from the LD 1a and that of the light beam 3b from the LD 1b, the first wavelength polarization filter 4a having the characteristics shown in FIG. 9A is employed. However, the first wavelength polarization filter 4a can be replaced with a known polarized beam splitter for a light beam of a wavelength of 635 nm. In this case, the fabrication costs can be further reduced.

EXAMPLE 5

Figure 11A:
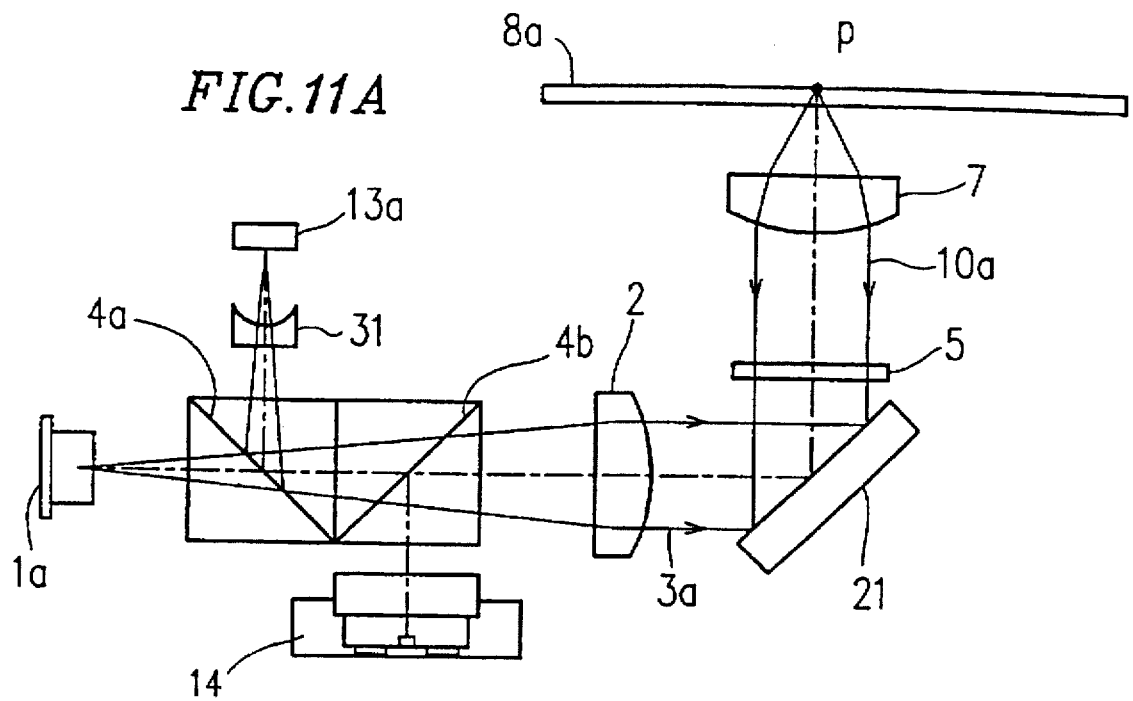
FIGS. 11A and 11B are side views each showing a fifth example of the present invention.

Now, Example 5 of the present invention is described with reference to FIGS. 11A and 11B. Also in Example 5, the first and the second optical disks 8a and 8b are different both in the thickness of the base material and in the available wavelength. The optical head of Example 5 includes an LD 1a for the first optical disk 8a and an LD 1b for the second optical disk 8b. In this example, the first optical disk 8a is a high-density optical disk whose base material is 0.5 mm thick and whose available wavelength is 535 nm, while the second optical disk 8b is an optical disk whose base material is 1.2 mm thick and whose available wavelength is 780 nm.

First, the case where the inserted optical disk is the high-density optical disk 8a will be described. The LD 1a of an oscillation wavelength of 635 nm outputs a P-polarized beam as the light beam 3a. The light beam 3a transmits through a first wavelength polarization filter 4a having characteristics as shown in FIG. 9A and a second wavelength polarization filter 4b having characteristics as shown An FIG. 9B, to be incident onto a collimate lens 2. The light beam 3a substantially collimated by the collimate lens 2 is reflected by a mirror 21 and incident onto a wave plate 5. Herein, the wave plate 5 is set so as to generate a phase difference of $\pi/2$ with respect to a light beam of a wavelength of 635 nm and a phase difference of $\pi$ with respect to a light beam of a wavelength of 780 nm. Therefore, the light beam 3a is converted into a circularly polarized beam by passing through the wave plate 5. The circularly polarized beam 3a is incident onto an objective lens 7. The objective lens 7 converts the light beam 3a into an imaging point p on the recording face of the high-density optical disk 8a. Thus, a beam spot is formed on the recording face of the high-density optical disk 8a.

Figure 9B:
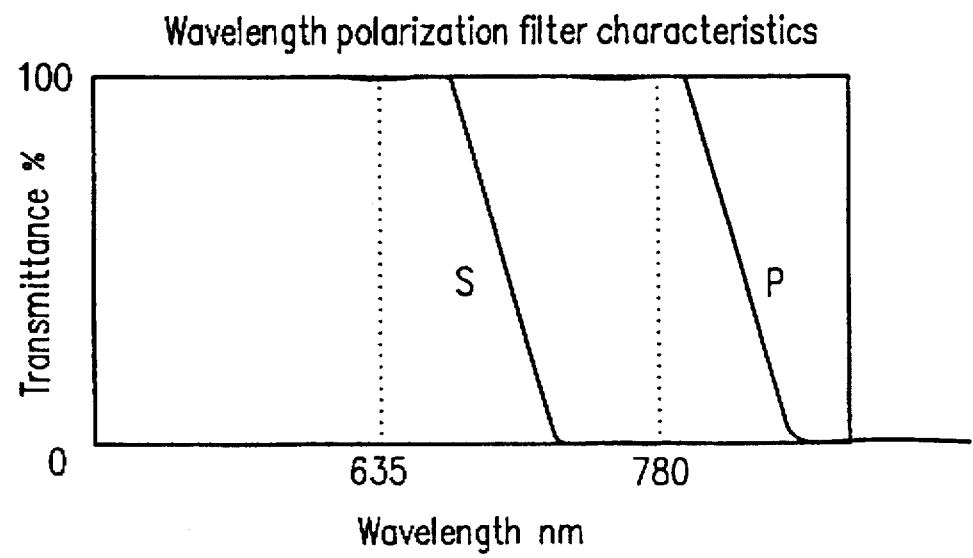

Thereafter, a light beam 10a, i.e., the light beam 3a reflected by the optical disk 8a, repasses through the objective lens 7, the wave plate 5, the mirror 21 end the collimate lens 2 in this order, so as to be incident on the second wavelength polarization filter 4b. Since the second wavelength polarization filter 4b has characteristics as shown in FIG. 9B, the light beam 10a transmits through the wavelength polarization filter 4b irrespective of its polarization, and then almost 100% of the transmitted light beam 10a is reflected by the wavelength polarization filter 4a. The reflected light beam 10a passes through a detection lens 31 and is incident onto a PD 13a. The PD 13a detects the focus control signal and the tracking control signal by the astigmatism method and the push-pull method, respectively, as well as the reproduction signal.

Next, the case where the inserted optical disk is the optical disk 8b such as a CD, whose base material is 1.2 mm thick, will be described. The LD 1b of an oscillation wavelength of 780 nm outputs a light beam 3b. The optical head of Example 5 provides the LD-PD integrated module 14 having the configuration shown in FIGS. 15 and 16. The detailed configuration of the LD-PD integrated module 14 will be described later. The 780 nm LD 1b provided in the LD-PD integrated module 14 outputs a linearly polarized beam whose polarization direction is perpendicular to that of the light beam 3a output from the LD 1a. That is, the light beam 3b output from the LD 1b is an S-polarized beam.

Figure 11B:
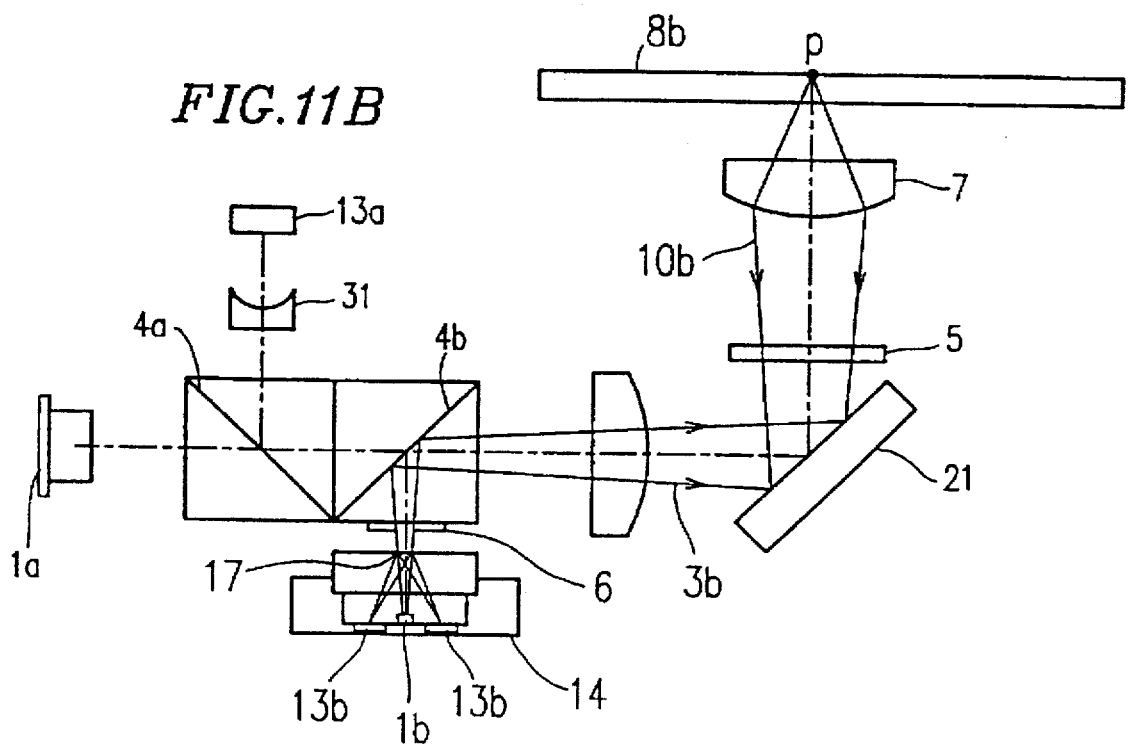

As shown in FIG. 11B, the light beam 3b output from the 780 nm LD 1b of the LD-PD integrated module 14 passes through the aperture 6 to be incident onto the first wavelength polarization filter 4b. The aperture 6 adjusts a beam radius of the light beam 3b so that a beam spot having an optimum radius for reproducing data from the optical disk 8b is formed on the recording face of the optical disk 8b whose base material as 1.2 mm thick. The light beam 3b is reflected by the second wavelength polarization filter 4b, since the second wavelength polarization filter 4b has transmittance-wavelength characteristics as shown in FIG. 9B. The light beam 3b is then incident on the collimate lens 2. This collimate lens 2 has been designed in accordance with the thickness of the base material of the above-mentioned disk 8a and the wavelength of the light beam 3a. As a result, the light beam 3b passed through the collimate lens 2 becomes not a completely collimated beam but a beam a little more scattered than the above-mentioned collimated light beam 3a. The scattered beam 3b is reflected by a mirror 21, and thereafter is incident onto the wave plate 5. When the light beam 3b passes through the wave plate 5, the wave plate 5 gives the phase difference of $\pi$ to the light beam 3b of a wavelength of 780 nm as described above, so as to rotate the polarization direction of the light beam 3b by 90°. In succession, the light beam 3b is incident onto the objective lens 7 to be converged into an imaging point p' on the recording face of the optical disk 8b. Thus, a beam spot is formed on the recording face of the optical disk 8b whose base material is 1.2 mm thick.

Thereafter, a light beam 10b, i.e., the light beam 3b reflected by the optical disk 8b, repasses through the objective lens 7, the wave plate 5, the mirror 21 and the collimate lens 2 in this order, to be incident on the second wavelength polarization filter 4b. At this time, the light beam 10b has become an S-polarized beam, with its polarization direction rotated over 90° by the function of the wave plate 5. Because of this, the light beam 10b is reflected at almost 100% by the second wavelength polarization filter 4b, and the reflected beam is incident onto the LD-PD integrated module 14. The light beam 10b incident onto the module 14 is diffracted by a hologram 17 formed on the front face of the module 14, and the diffracted beams are incident onto the PD 13b. Similarly to Example 4, the PD 13b detects the focus control signal end the tracking control signal as well as the reproduction signal.

In Example 5, in order to make the optical head thinner and more compact, the mirror 21 is used for bending the optical paths. Thus, whether the mirror 21 exists or not is irrespective of the operation of the optical head. Accordingly, the light beam output from the collimate lens 2 may be incident directly onto the wave plate 5, without being reflected by the mirror 21.

Also in Example 5, the collimate lens 2, the objective lens 7 and the like are designed in accordance with the base material thickness (0.6 mm) and the available wavelength (635 nm) of the optical disk 8a. As a result, in order to reduce a wavefront aberration generated when the optical beam 3b is converged onto the optical disk 8b whose base material is 1.2 mm thick and available wavelength is 780 nm, the optical path length between the LD 1b and the collimate lens 2 is set so as to be different from the optical path length between the LD 1a and the collimate lens 2. The optical path length between the LD 1b and the collimate lens 2 is determined as discussed above with reference to FIG. 3A.

Moreover, Example 5 makes it possible to minimize the number of planes by which the light beam 3a of a wavelength of 635 nm is reflected on the optical path from the LD 1a to the imaging point p on the recording face of the high-density optical disk 8a whose base material is 0.6 mm thick. As a result, an accuracy of the wavefront aberration at the imaging point p is improved, which assures good reproduction characteristics.

EXAMPLE 6

Now, Example 6 of the present invention is described with reference to FIGS. 12A and 12B. Also in Example 6, optical disks 8a and 8b are different both in the thickness of the base material and in the available wavelength. The base material thickness and available wavelength of the optical disk 8a, those of the optical disk 8b, and the oscillation wavelengths of an LD 1b for the optical disk 8b and an LD 1b for the optical head 8b are the same as described in Example 5.

Figure 12A:
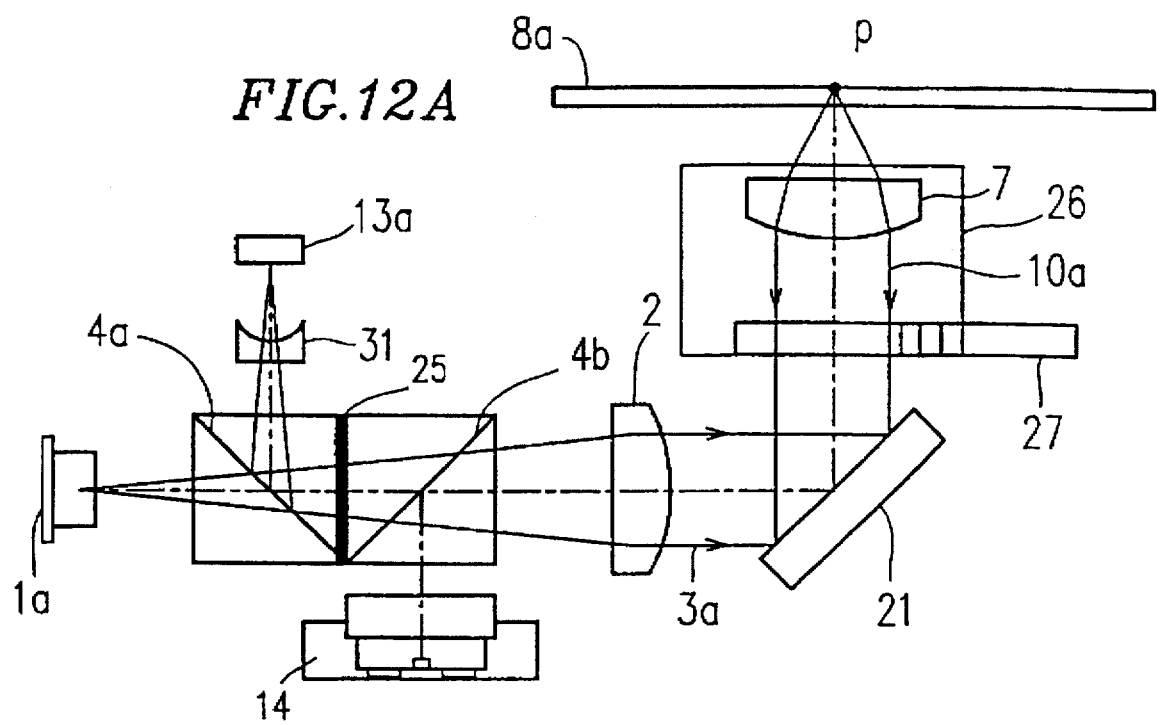
FIGS. 12A and 12B are side views each showing a sixth example of the present invention.
Figure 12B:
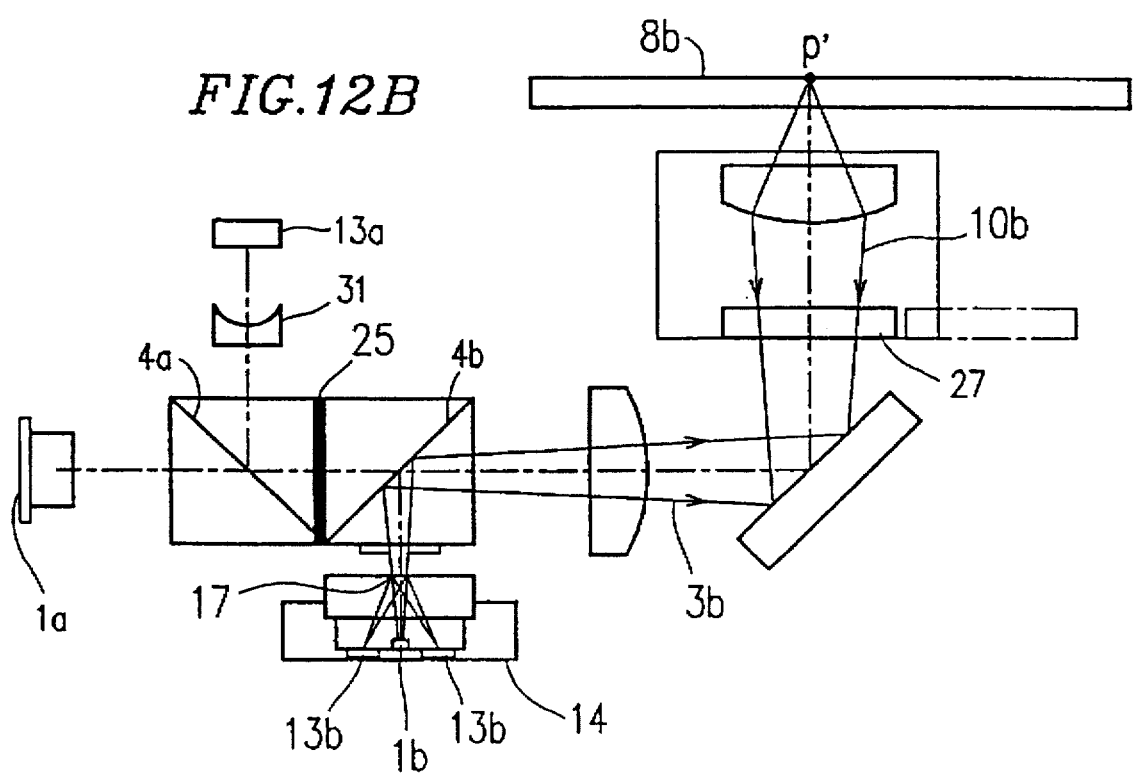

FIG. 12A shows the case where the high-density optical disk 8a whose base material is 0.6 mm thick is inserted in the optical data recording/reproducing apparatus using the optical head of Example 6, and FIG. 12B shows the case where the optical disk 8b whose base material is 1.2 mm thick is inserted therein. In Example 6, the wave plate 25 is used in place of the wave plate 5 of Example 5. Similarly to Example 4, the wave plate 25 is set so as to provide a phase difference of $\pi/2$ with a light beam of a wavelength of 635 nm, and is disposed between the first wavelength polarization filter 4a and the second wavelength polarization filter 4b instead of being on the optical path between a mirror 21 and an objective lens 7. Consequently, the wave plate 25 changes only the polarization direction of a light beam 3a output from the LD 1a of an oscillation wavelength of 635 nm, without affecting the light beam 3b output from the LD-PD integrated module 14. In addition, in Example 6, a movable plate 27 having an aperture is mounted on an actuator 26 for moving the objective lens 7 at the side facing the mirror 21. The movable plate 27 is retracted from the optical path when the recording/reproducing operation of the high-density optical disk 8a is performed, and is moved so as to be on the optical path when the recording/reproducing operation of the optical disk 8b whose base material is 1.2 mm thick is performed. That is, the entire aperture of the objective lens 7 is used for the high-density optical disk 8a, while at the time of performing the recording/reproducing operation of the optical disk 8b whose base material is 1.2 mm thick the beam radius of the light beam 3b is adjusted so that a beam spot having the radius optimum for the reproducing operation of the optical disk 8b is formed. Except for the differences in the optical configuration as described above, the optical configuration of the optical head of Example 6 is the same as that of Example 5.

In Example 6, the characteristics of the wave plate 25 are free from restrictions with respect to the light beam of a wavelength of 780 nm, as long as it functions as a normal quarter-wave plate solely for the light beam of e wavelength of 635 nm. Thus, an inexpensive optical component can be used as the wave plate 25, which allows the optical head to be fabricated at a lower cost.

Furthermore, since the movable plate 27 having the aperture is disposed on the optical path, when the objective lens actuator 26 follows the movement of track due to the eccentricity of the optical disk, the light amount of the light beam converged on the optical disk is reduced or the aberration on the optical disk is increased. However, in Example 6, since the movable plate 27 having the aperture is integrally provided in the objective lens actuator the aperture moves along with the movement of the objective lens actuator 26, whereby the reduction of the light amount of the converged beam 3b and the increase of the aberration on the optical disk 8b can be lessened.

EXAMPLE 7

Figure 13A:
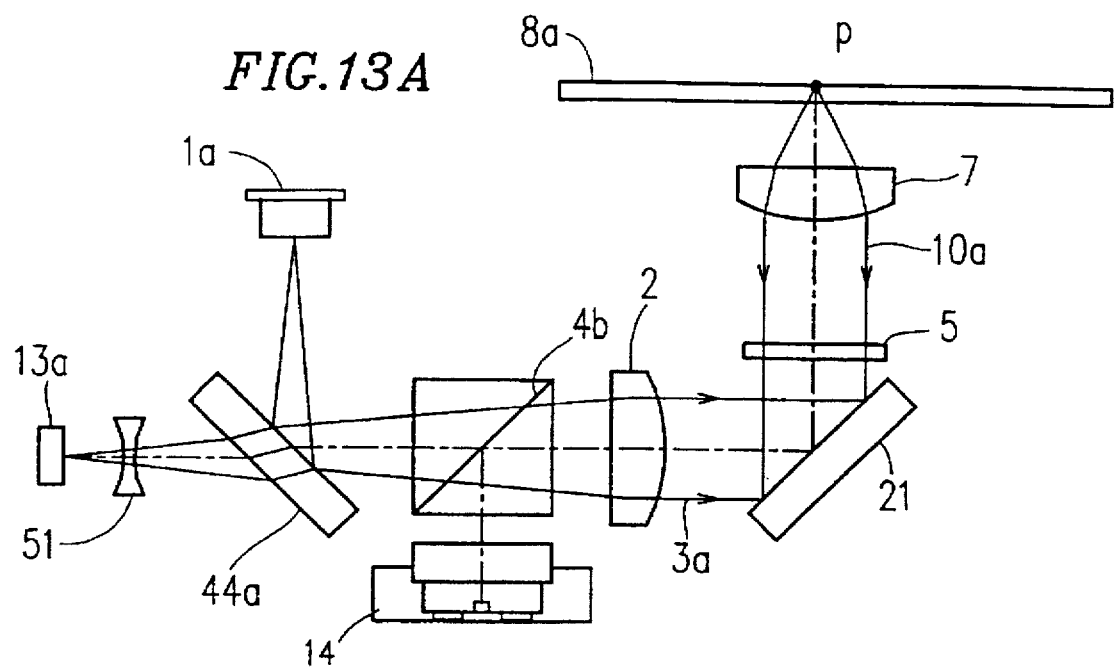
FIGS. 13A and 13B are side views each showing a seventh example of the present invention.

Now, Example 7 of the present invention is described with reference to FIGS. 13A end 13B. Also in Example 7, the first optical disk 8a and the second optical disk 8b are different both in the thickness of the base material and in the available wavelength, and an LD 1a for the first optical disk 8a and an LD 1b for the second optical disk 8b are provided in the optical head. The first optical disk 8a is a high-density disk whose base material thickness and the available wavelength of the high density thin-shaped optical disk 8a are 0.6 mm and 635 nm, respectively. The base material thickness and the available wavelength of the optical disk 8b are 1.2 mm and 780 nm.

First, the case where an optical disk which is to be recorded or reproduced is the thin high-density optical disk 8a will be described. A light beam 3a output from the LD 1a of an oscillation wavelength of 635 nm, is incident onto the first wavelength polarization filter 44a. Herein, the LD 1a outputs an S-polarized beam as the light beam 3a. The wavelength polarization filter 44a is a filter having characteristics as shown in FIG. 9A end has a plate-shape in which the two main surfaces are substantially parallel to each other. Thus, the light beam 3a is reflected by one of the two main surfaces of the first wavelength polarization filter 44a, and then is incident onto the second wavelength polarization filter 4b. Since this filter 4b has characteristics as shown in FIG. 9B, the light beam 3a is transmitted irrespective of its polarization, and is incident onto a collimate lens 2. Having been collimated by the collimate lens 2, the light beam 3a is reflected by a mirror 21 and is incident onto the wave plate 5. Similar to the above-mentioned Example 5, the wave plate 5 is set so as to provide a phase difference of π/2 with a light beam of a wavelength of 635 nm and that of π with a light beam of a wavelength of 780 nm. Therefore, the light beam 3a is converted into a circularly polarized beam by passing through the wave plate 5, and thereafter is incident onto an objective lens 7. The objective lens 7 converges the light beam 3a into an imaging point p on the recording face of the high-density optical disk 8a. Thus, a beam spot is formed on the recording face of the optical disk 8a.

Thereafter, a light beam 10a, which is the light beam 3a reflected by the optical disk 8a repasses the objective lens 7, the wave place 5, the mirror 21 and the collimate lens 2 in this order so as to be incident onto the second wavelength polarization filter 4b. The light beam 10a transmits the second wavelength polarization filter 4b irrespective of its polarization, and is incident onto the first wavelength polarization filter 44a. Since the light beam 10a has been converted into a P-polarized beam by passing through the wave plate 5, the light beam 10a transmits through the first wavelength polarization filter 44a, passes through a detection lens 51, and is incident onto a PD 13a for the optical disk 8a. The PD 13a is configured so as to detect the focus control signal by the astigmatism method, in which an astigmatism caused by the light beam 10a passing through the parallel two main surfaces of the first wavelength polarization filter 44a is detected, and the tracking signal by the push-pull method.

Figure 13B:
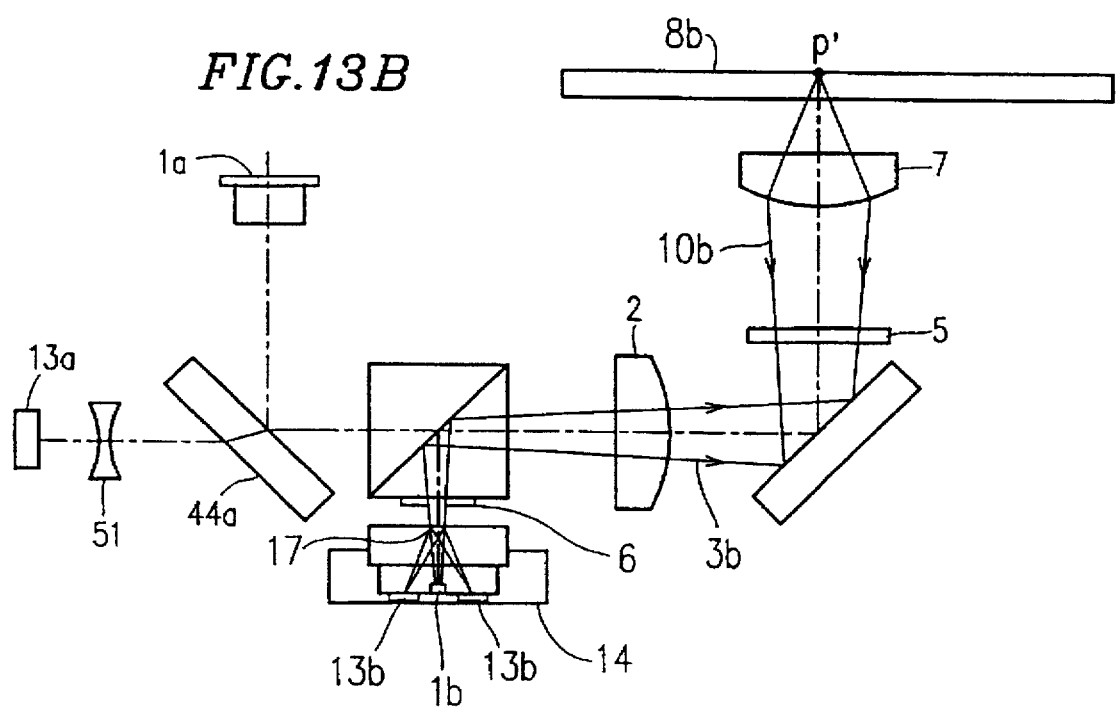
Figure 16:
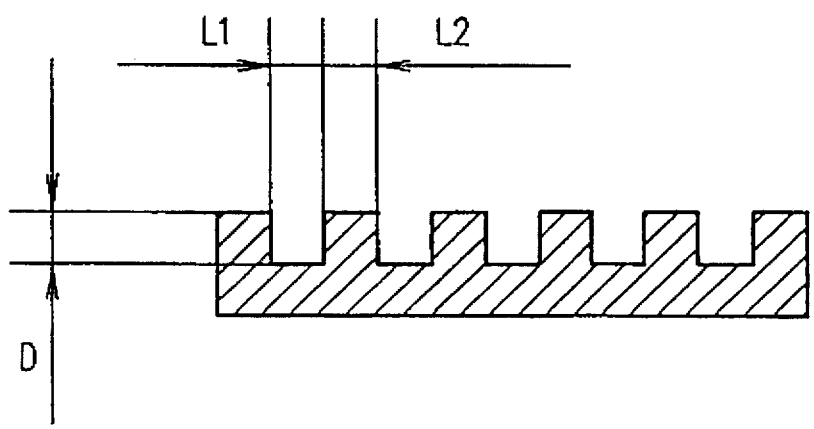
FIG. 16 is a cross-sectional view showing a pattern of a grating provided in the laser-detector integrated module shown in FIG. 15.

Next, the case where the optical disk to be recorded or reproduced is the optical disk 8b such as a CD, whose base material is 1.2 mm thick, will be described. The LD 1b of an oscillation wavelength of 780 nm outputs a light beam 3b. In Example 7, the LD 1b is disposed so as to output a linearly polarized beam whose polarization direction is perpendicular to that of the light beam 3a output by the LD 1a for the high-density optical disk. That is, the LD 1b emits a P-polarized beam as the light beam 3b. Similar to Examples 4 through 6, the LD 1b is provided in the LD-PD integrated module 14. The configuration of the LD-PD integrated module 14 is shown in FIGS. 15 and 16 and will be described later. As becomes apparent by comparing FIG. 13B with FIG. 11B, the optical configuration of Example 7 in the case of performing the recording/reproducing operation of the optical disk 8b whose base material is 1.2 mm thick is the same as the optical configuration of Example 5.

Also in Example 7, the collimate lens 2, the objective lens 7 and the like are designed in accordance with the base material thickness (0.6 mm) and the available wavelength (635 nm) of the optical disk 8a. Because of this, the optical path length between the LD 1b for the optical disk 8b and the collimate lens 2 is set so as to be different from the optical path length between the LD 1a for the optical disk 8a and the collimate lens 2, as described above with reference to FIG. 3A. As a result, also in Example 7, the wavefront aberration arising when the optical beam 3b is converged onto the optical disk 8b can be reduced to such an extent as negligible in performing the recording/reproducing operation of the optical disk 8b.

Moreover, in Example 7, a filter having a plate shape in which two main surfaces are parallel with each other is used as the first wavelength polarization filter 44a for separating the optical path of the optical beam 3a output from the LD 1a and that of the reflected beam 10a from each other. Since the focus control signal can be detected by using the astigmatism generated by means of this plate-shape filter 44a, there is no necessity of especially providing optical components for generating the astigmatism. This makes it possible to reduce the number of optical components used in the optical head, which assures an inexpensive optical head.

In Example 7, a filter having characteristics as shown in FIG. 9a is used as the first wavelength polarization filter 44a. This filter 44a may be replaced with a standard-type polarized beam splitter (PBS) for a light beam of a wavelength of 635 nm, whereby the fabrication cost of the optical head can be further reduced.

The optical head of Example 7 is preferably designed so that the incidence angle of the light beam 3a with respect to one of the two main surfaces of the first wavelength polarization filter 44a is 45° or more.

EXAMPLE 8

Figure 14A:
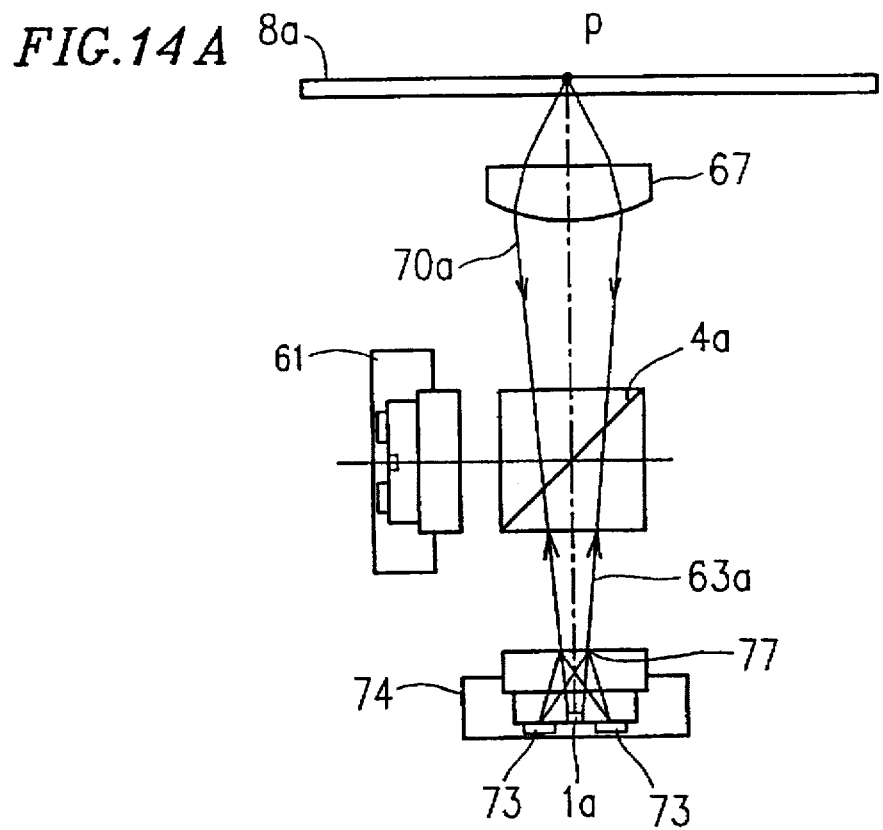
FIGS. 14A and 14B are side views each showing an eighth example of the present invention.

Now, Example 8 of the present invention is described with reference to FIGS. 14A and 14B. Also in Example 8, the first optical disk 8a and the second optical disk 8b are different both in the thickness of the base material and in the available wavelength, and an LD 1a for the first optical disk 8a and an LD 1b for the second optical disk 8b are provided in the optical head. However, unlike the above discussed Examples 4 through 6, each of the LDs 1a and 1b is provided in the LD-PD integrated module. Both of the LD-PD integrated modules have the same configuration as shown in FIG. 15. In Example 8, the first optical disk 8a is a high-density optical disk 8a whose base material is 0.6 mm thick and whose available wavelength is 635 nm, and the second optical disk 8b is an optical disk whose base material is 1.2 mm and whose available wavelength is 780 nm. The oscillation wavelengths of the LDs 1a and 1b are 635 nm and 780 nm, respectively.

First, the case where an optical disk to be recorded or reproduced is the high-density optical disk 8a will be described. A light beam 63a output from the LD 1a, provided in a first LD-PD integrated module 74, is incident onto a wavelength polarization filter 4a having characteristics as shown in FIG. 9a. Since the LD 1a outputs a P-polarized beam as the light beam 63a, the light beam 63a transmits through the wavelength polarization filter 4a. By means of an objective lens 67, the transmitted light beam 63a is converged into an imaging point p on the recording face of the high-density optical disk 8a whose base material is 0.6 mm thick. Thus, a beam spot is formed on the recording face of the high-density optical disk 8a.

Thereafter, a light beam 70a, which is the light beam 63a reflected by the high-density optical disk 8a, repasses through the objective lens 67 and the wavelength polarization plate 4a in this order, to be incident on the first LD-PD integrated module 74. The incident light beam 70a is diffracted by a hologram 77 formed on the front face of the LD-PD integrated module 74. The diffracted light beams are incident onto a PD 73. The PD 73 is configured so as to detect the focus control signal and the tracking control signal by the SSD method and the three-beam method, respectively, as well as the reproduction signal.

Next, the case where the optical disk to be recorded or reproduced is the optical disk 8b such as a CD, whose base material is 1.2 mm thick, will be described. The LD 1b of an oscillation wavelength of 780 nm, provided in a second LD-PD integrated module 61, outputs a light beam 63b. The LD 1b is disposed so as to output a linearly polarized beam whose polarization direction is perpendicular to that of the light beam 63a output from the LD 1a for the optical disk 8a. That is, the LD 1b outputs an S-polarized beam.

FIG. 15 shows the arrangement of optical components included in each of the LD-PD integrated modules in an enlarged form. Herein, the configuration of the second LD-PD integrated module 61 is described for example. In FIG. 15, the light beam 63b output from the LD 1b is reflected by a mirror 82 and is incident onto a ring-shaped grating 83, wherein the light beam 63a is divided into a main beam (a 0th order beam) and two sub-beams (±1st order beams) to be used for detecting the tracking control signal. The shape of the ring-shaped grating 83 is shown in FIG. 16. In designing the ring-shaped grating 83, the depth D of grooves is determined so that where n stands for the reflective index of the grating 83, (n−1) becomes 2/N times the wavelength of the light beam 63b. The width L1 of a convex portion and the width L2 of the groove have a ratio of 1:1. In addition, the diffraction efficiency of the 0th beam of the ring-shaped grating 83 is theoretically 0%. That is, the ring-shaped grating 83 limits the radius of the main beam. Accordingly, the light beam 63 is, with its beam radius having been narrowed by the ring-shaped grating 83, converged onto the optical disk 8b whose base material is 1.2 mm thick so as to form a beam spot having an optimum spot radius for recording/reproducing data on and from the optical disk 8b.

Figure 14B:
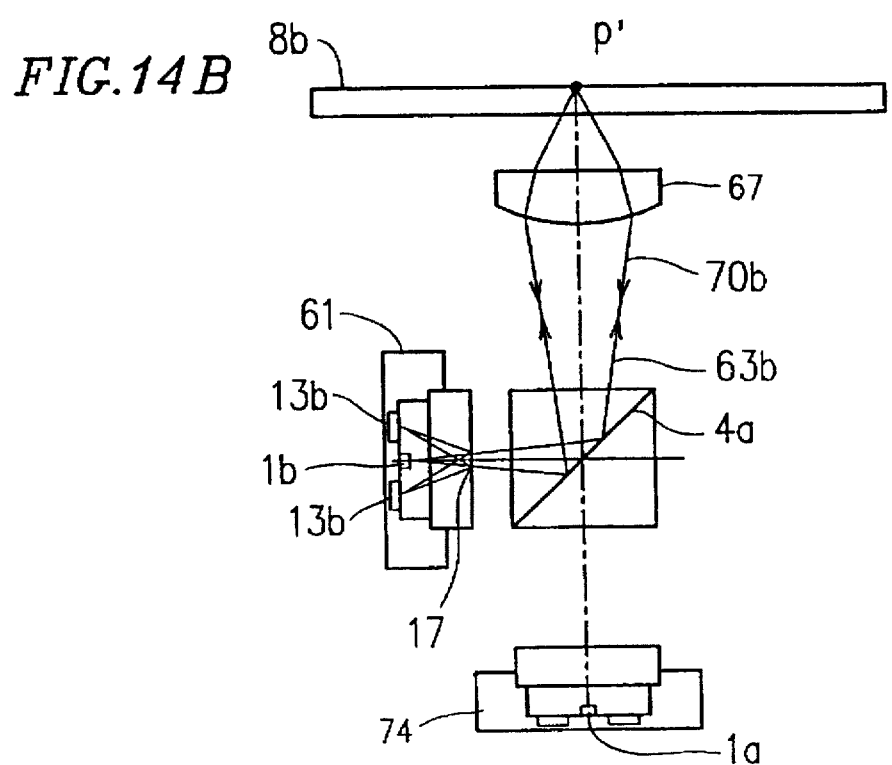

In FIG. 14B, the light beam 63b output from the second LD-PD integrated module 61 is reflected by the wavelength polarization filter 4a to be incident onto the objective lens 67. The light beam 63b is converged by the objective lens 67 into an imaging point p' on the recording face of the optical disk 8b whose base material is 1.2 mm thick, and thus a beam spot is formed on the recording face of the optical disk 8b. Thereafter, a light beam 70b, i.e., the light beam 63b reflected by the optical disk 8b, repasses through the objective lens 67, and is reflected by the wavelength polarization filter 4a to be incident on the second LD-PD integrated module 61. The incident light beam 70b is diffracted by a hologram 17 formed on the front face of the LD-PD integrated module 61, and the diffracted light beams are incident onto a PD 13b. The hologram 17 is designed so that the diffracted light beams cannot be incident on the ring-shaped grating 83. The PD 13b detects the focus control signal and the tracking control signal by the SSD method and the three-beam method, respectively, as well as the reproduction signal.

Two LD-PD integrated modules are provided in the optical head of Example 8. So, a compact, inexpensive and simply configured optical head is realized, because the number of optical components can be reduced. In addition, since the beam radius of the light beam 63b in the recording/reproducing operation of the optical disk 8b whose base material is 1.2 mm thick is limited by the ring-shaped grating 83 for generating the sub-beams as shown in FIG. 15, the eclipse of the sub-beams at the lens aperture can be reduced. As a result, the light beam 63a output from the LD 1b can be used more efficiently.

In Example 8, only the ring-shaped grating has the function of adjusting the beam radius of the light beam emitted from the LD. However, the optical head may further include another optical component having the above-described function such as the aperture as in Examples 4 to 7. In this case, the aperture can be disposed anywhere on the optical path from the LD to the objective lens. For example, the movable plate 27 as shown in FIG. 12B having an aperture can be attached to the actuator 26 for moving the objective lens 7. The aperture 6 can be disposed between the LD and the wavelength polarizing filter. In addition, in the case of providing an optical component having a function of adjusting the beam radius, other than the ring-shaped grating in the LD-PD integrated module, the inner radius of the ring-shaped grating may be smaller than the radius of the optical component for adjusting the beam radius.

Furthermore, in the present Example 8, the polarization direction of the light beam 63b of a wavelength of 635 nm output from the first LD-PD integrated module 74 is rendered a P-polarized beam. However, by using the wavelength polarization filter 4b having characteristics as shown in FIG. 9B in place of the wavelength polarization filter 4a, the first LD-PD integrated module 74 can be arranged to output an S-polarized beam. In this case, the light beam 63b of a wavelength of 780 nm, output from the second LD-PD integrated module 61, becomes such a polarized beam that it can be reflected by the wavelength polarization filter 4b, i.e., an S-polarized beam. Thus, by modifying the characteristics of the wavelength polarization filter, the polarization direction of the light beam incident onto this filter can be changed. This makes it possible to change the arrangement of each of the LD-PD integrated modules. In addition, by adding a rising mirror or the like to the optical configuration as shown in FIGS. 14A and 14B, the optical head can be rendered thinner.

EXAMPLE 9

Figure 17A:
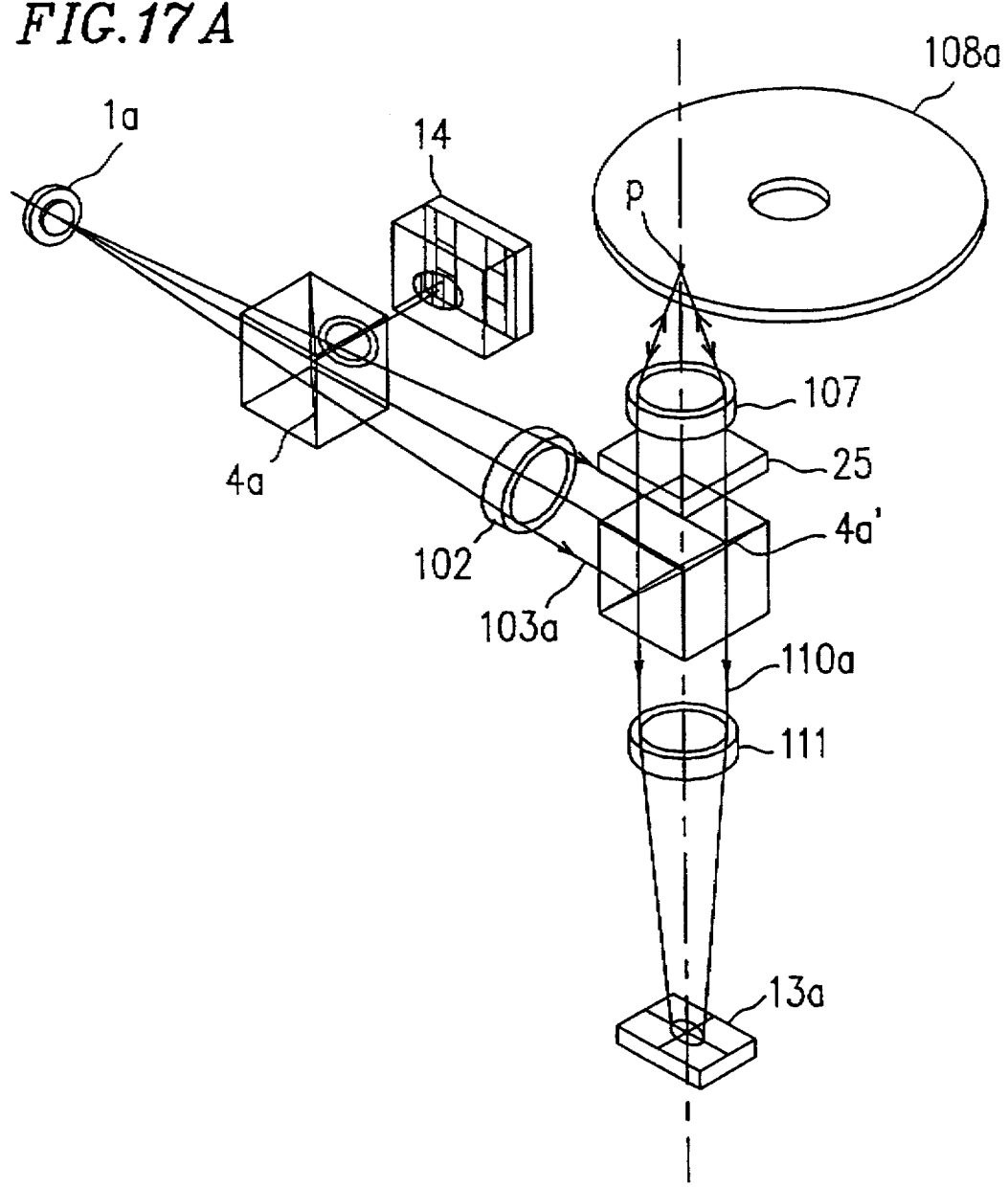
FIGS. 17A and 17B are side views each showing a ninth example of the present invention.

Example 9 of the present invention is described with reference to FIGS. 17A and 17B. In Example 9, the first optical disk 108a and the second optical disk 108b have the same base material thickness, while being different in the available wavelength. In Example 9, the base material thickness of the optical disks 108a and 108b is 1.2 mm, and the available wavelengths of the optical disks 108a and 108b are 635 nm and 780 nm, respectively.

The first optical disk 108a is a high-density disk. First, with reference to FIG. 17A, the case where an optical disk to be recorded or reproduced is the high-density optical disk 108a will be described. A light beam 103a output from an LD 1a of an oscillation wavelength of 635 nm, is incident onto the first wavelength polarization filter 4a having characteristics as shown in FIG. 9A. Since the LD 1a is arranged so as to output a P-polarized beam as the light beam 103a, the light beam 103a passes through the first wavelength polarization filter 4a, and then is substantially collimated by a collimate lens 102. Thereafter, the collimated light beam is incident onto a second wavelength polarization filter 4a'.

This second wavelength polarization filter 4a' also has the characteristics as shown in FIG. 9A, but is disposed being spatially twisted at 90° with respect to the first wavelength polarization filter 4a. Because of this, the light beam 103a is incident onto the second wavelength polarization filter 4a as an S-polarized beam, and is reflected thereby. In succession, the light beam 103a is incident onto the wave plate 25. Similarly to Example 1, the wave plate 25 is designed so as to provide a phase difference of π/2 with a light beam of a wavelength of 635 nm. Therefore, the light beam 103a is converted from an S-polarized beam into a circularly polarized beam, by passing through the wave plate 25. An objective lens 107 converts the circularly polarized beam 103a into an imaging point p on the recording face of the high-density optical disk 108a. Thus, a beam spot is formed on the recording face of the high-density optical disk 108a.

The light beam 103a is reflected by the high-density optical disk 108a to be incident onto the objective lens 107 again, as a reflected beam 110a. In succession, the light beam 110a incident onto the wave plate 25 is converted from the circularly polarized beam to a P-polarized beam, and thereafter is incident onto the second wavelength polarization filter 4a'. Since the second wavelength polarization filter 4a' has the characteristics as shown in FIG. 9A, the light beam 110a passes through the filter 4a' without being affected thereby. Then, via e detection lens 111, the light beam 110a is incident onto a PD 13 for the first optical disk 8a. On the basis of the incident light beam 110a, the PD 13 detects the focus control signal and the tracking control signal as well as the reproduction signal. In Example 9, the focus signal is detected by the astigmatism method, while the tracking control signal is detected by the push-pull method.

Figure 17B:
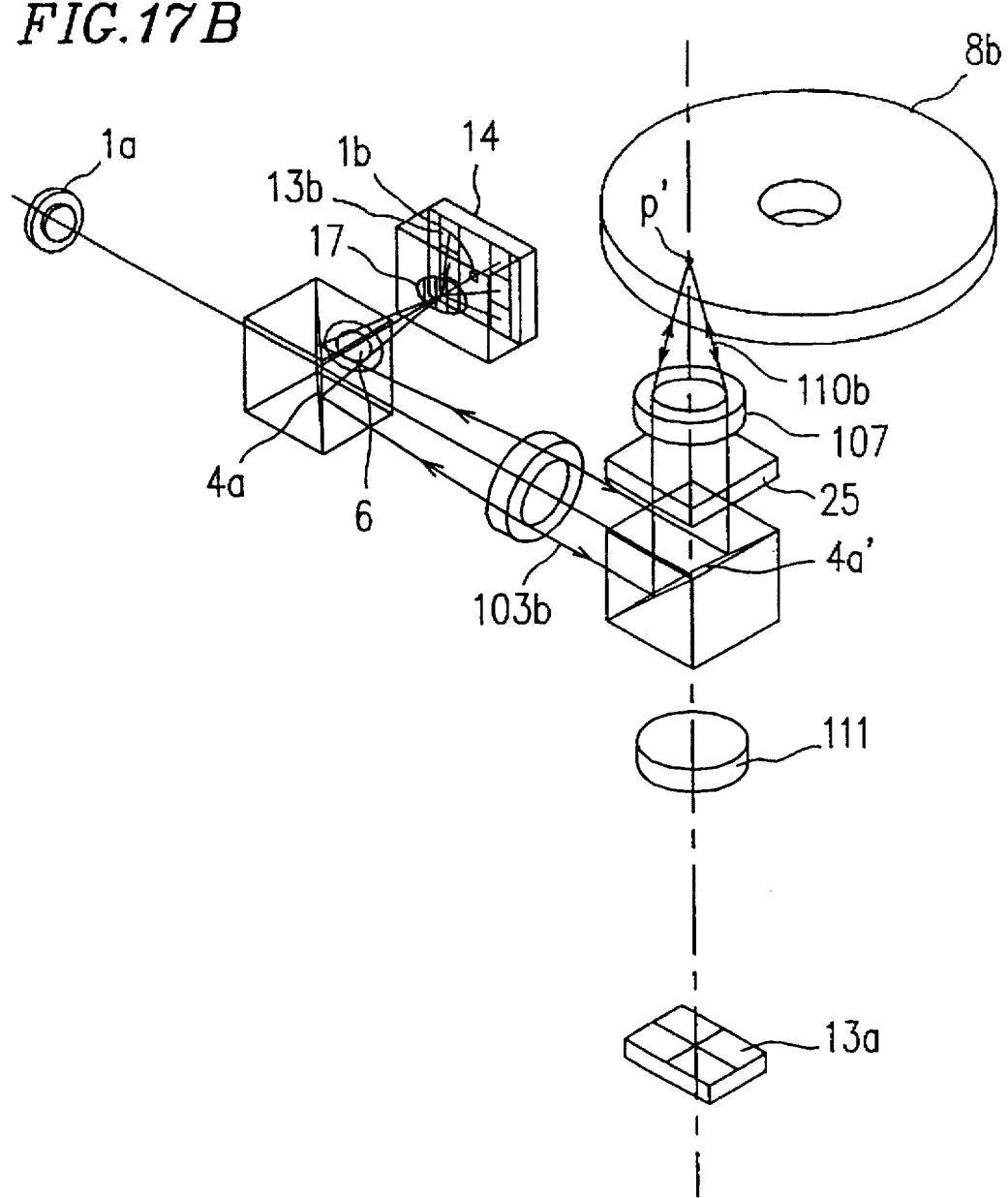

FIG. 17B shows the optical path in the case where the optical disk to be recorded or reproduced is the optical disk 108b whose available wavelength is 780 nm. In this case, the optical configuration and the detailed configuration of the LD-PD integrated module 14 are the same as discussed above in Example 4.

Also in the present Example 9, the collimate lens 102, the objective lens 107 and the like are designed in accordance with the base material thickness (1.2 mm) and the available wavelength (635 nm) of the high-density optical disk 108a. For this reason, the LD-PD integrated module 14 is disposed at a position such that the optical path length between the LD 1b and the collimate lens 102 is different from the optical path length between the LD 1a and the collimate lens 102. More specifically, the optical path length between the LD 1b and the collimate lens 102 is determined as described above referring to FIG. 3B. For example, it is assumed that the focal length of the collimate lens 102 and that of the objective lens are 3.7 mm and 22.5 mm, respectively, and the converging optical system is designed so that the light beam 103a from the LD 1a is converged on the optical disk 8a whose available wavelength is 635 nm in such a way that the wavefront aberration becomes 10 mλ (rms) or less. In this case, as is apparent from FIG. 3B, it is when the optical path length between the LD 1b and the collimate lens 102 is about 21.8 mm that the wavefront aberration when the light beam 103b is converged on the optical disk 108b is minimized. In this way, by adjusting the optical path length between the LD 1b for the optical disk 108b and the collimate lens 102, even when using the optical system designed in accordance with the base material thickness and the available wavelength of the optical disk 108a, the wavefront aberration caused by converging the light beam 103b on the optical disk 108b can be reduced to such a low level as to be negligible in the recording/reproducing operation of the optical disk 108b.

The configuration of this Example 9 employs the first wavelength polarization filter 4a having characteristics as shown in FIG. 9A. Hence, the wave plate 25 only functions as an isolator solely for the light beam 103a of a wavelength of 635 nm, while there is no necessity of providing an isolator for the light beam 103b of a wavelength of 780 nm. Thus, this system can be fabricated using inexpensive components. In addition, since the first and second wavelength polarization filters 4a and 4a' are of the same design, the optical head can be fabricated at a low cost. Furthermore, it is possible to minimize the number of planes by which the light beam 103a of a wavelength of 635 nm is reflected on the optical path from the LD 1a to the imaging point p on the recording face of the high-density optical disk 108a. Accordingly, the wavefront aberration at the imaging point p can be obtained more accurately. Thus, good reproduction characteristics are realized.

Example 9 employs the first wavelength polarization filter 4a having characteristics as shown in FIG. 9A, in order to combine the optical path of the light beam 103a from the LD 1a and that of the light beam 103b from the LD 1b. This first wavelength polarization filter 4a can be replaced with a standard-type polarized beam splitter for a light beam of a wavelength of 635 nm. In this case, the fabrication cost can be further reduced.

EXAMPLE 10

Figure 18A:
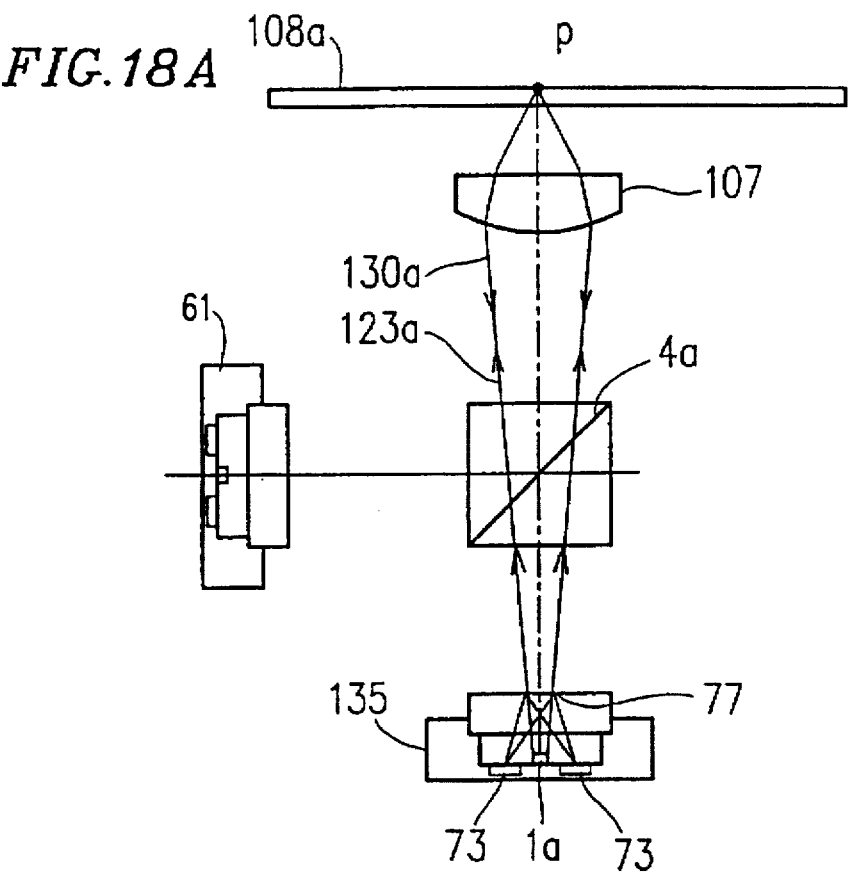
FIGS. 18A and 18B are side views each showing a tenth example of the present invention.

Example 10 of the present invention is described with reference to FIGS. 18A and 18B. In Example 10, the first optical disk 108a and the second optical disk 108b have the same base material thickness, while being different in the available wavelength. This example is described on the assumption that the base material thickness of the optical disks 108a and 108b is 1.2 mm, and the available wavelengths of the optical disks 108a and 108b are 635 nm and 780 nm, respectively. Similar to the above-mentioned Example 9, an optical head of Example 10 includes an LD 1a for the first optical disk 108a and an LD 1b for the second optical disk 108b. However, unlike Example 9, these LDs 1a and 1b are provided LD-PD integrated modules 135 and 61, respectively.

First, with reference to FIG. 18A, the case where an optical disk to be recorded or reproduced is the high-density optical disk 108a will be described. A light beam 123a output from the LD 1a of an oscillation wavelength of 635 nm is incident onto a first wavelength polarization filter 4a having characteristics as shown in FIG. 9A. Since the LD-PD integrated module 135 is disposed so that a P-polarized beam is output from the LD 1a as the light beam 123a, the light beam 123a passes through the first wavelength polarization filter 4a to be incident onto an objective lens 107. The objective lens 107 converges the transmitted light beam 123a into an imaging point p on the recording face of the high-density optical disk 108a. Thus, a beam spot is formed on the recording face of the high-density optical disk 108a.

The light beam reflected by the high-density optical disk 108a is incident onto the objective lens 107 again, as a light beam 130a. The light beam 103a passes through the wavelength polarization filter 4a to be incident onto the laser-detector integrated module 135. The incident light beam 130a is diffracted by a hologram 17 formed on the front face of the module 135. The diffracted beams are incident onto a PD 73 for the high-density optical disk 108a. The PD 73 is configured so as to detect a focus control signal by the SSD method and the tracking control signal by the three-beam method, respectively, as well as the reproduction signal.

Figure 18B:
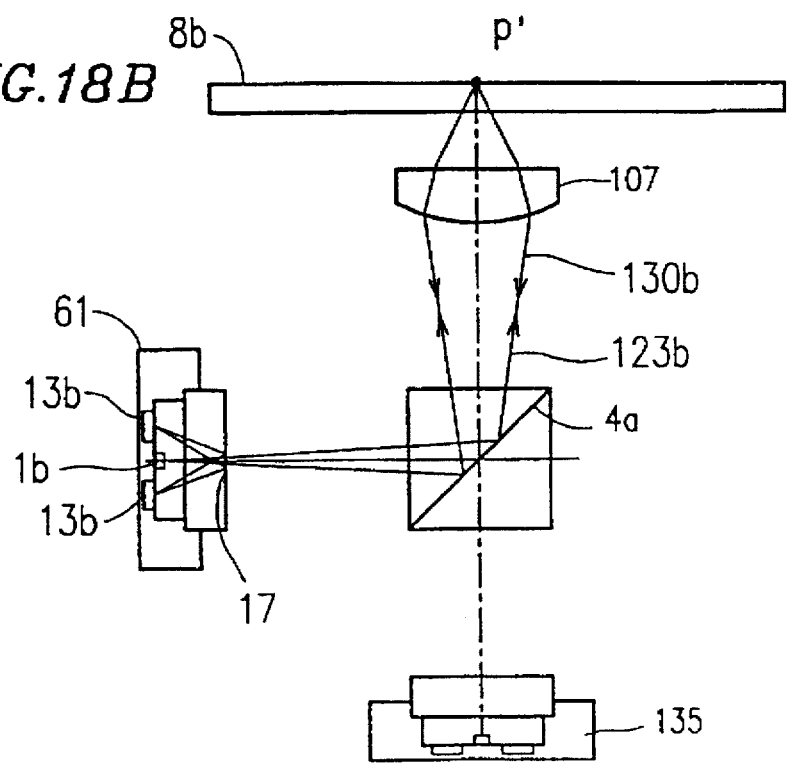
Figure 19A:
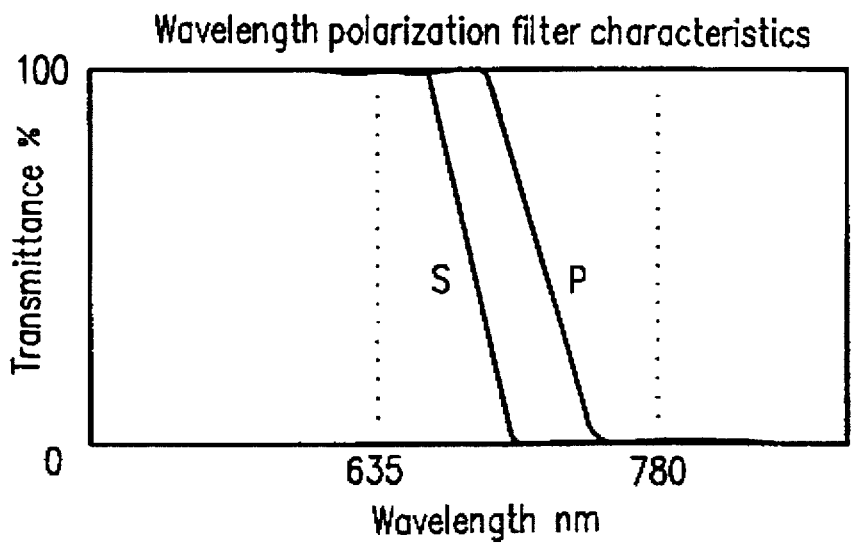
FIGS. 19A and 19B are diagrams each showing the relationship between the transmittance and the wavelength of the wavelength polarization filter.
Figure 19B:
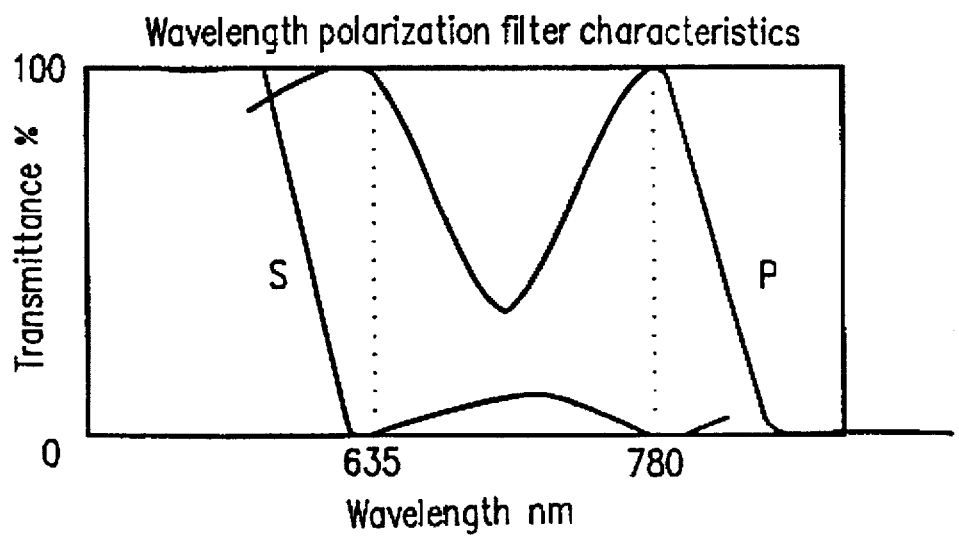

FIG. 18B shows the optical path in the case where the optical disk to be recorded or reproduced is the optical disk 108b whose available wavelength is 780 nm. As is apparent from FIG. 18B, the configuration of the optical head in this case, which is the same as that of the above-mentioned Example 8, will not described in detail here. It is to be noted that the LD-PD integrated module 61 is designed so that polarization direction of a linearly polarized beam output from the LD 1b is perpendicular to that of a linearly polarized beam output from the LD 1a. The detailed configuration of the LD-PD integrated module 61 is similar to that of Example 8.

Also in the present Example 10, the collimate lens 102, the objective lens 107 and the like are designed in accordance with the base material thickness (1.2 mm) and the available wavelength (635 nm) of the high-density optical disk 108a. For this reason, the LD-PD integrated module 61 is disposed at a position such that the optical path length between the LD 1b and the collimate lens 102 is different from the optical path length between the LD 1a and the collimate lens 102. More specifically, the optical path length between the LD 1b and the collimate lens 102 is determined as described above referring to FIG. 3B. In this way, by adjusting the optical path length between the LD 1b for the second optical disk 108b and the collimate lens 102, even when using the optical system designed in accordance with the base material thickness and the available wavelength of the first optical disk 108a, the wavefront aberration caused by converging the light beam 123b on the second optical disk 108b can be reduced to such a low level as negligible in the recording/reproducing operation of the second optical disk 108b.

In Example 10, similar to the above-mentioned Example 8, a simple optical configuration is realized by using two LD-PD integrated modules. As a result, a compact and inexpensive optical head can be obtained.

Furthermore, the configuration of Example 10 makes it possible to eliminate the reflecting plane by which the light beam 123a of a wavelength of 635 nm is reflected on the optical path from the LD 1a to the imaging point p on the recording face of the high-density optical disk 8a whose base material is 1.2 mm thick. As a result, the accuracy of the wavefront aberration at the imaging point p can be improved, which leads to good reproduction characteristics.

Moreover, though the light beam 123a of a wavelength of 635 nm output from the first LD-PD integrated module 135 is rendered a P-polarized beam in Example 10, the light beam 123a can be rendered an S-polarized beam by using the wavelength polarization filter 4b having characteristics as shown in FIG. 9B in place of the wavelength polarization plate 4a. In this case, the light beam 123b of a wavelength of 780 nm, output from the second LD-PD integrated module 61, becomes such a polarized beam as can be reflected by the wavelength polarization filter 4b, i.e., an S-polarized beam. Thus, by modifying the characteristics of the wavelength polarization filter, the polarization direction of the light beam incident onto the filter can be changed. This makes it possible to change the arrangement of each of the LD-PD integrated modules. In addition, by adding a rising mirror or the like to the optical configuration as shown in FIGS. 18A and 18B, it becomes possible to make the optical head thinner.

Figure 20:
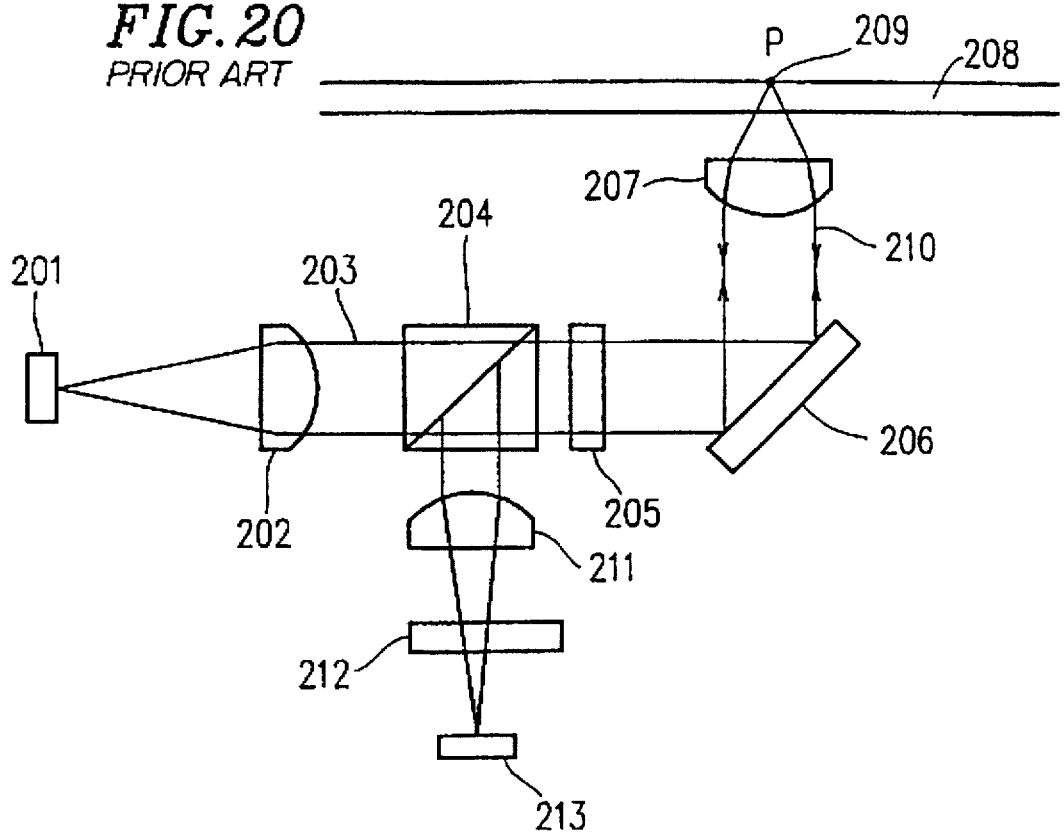
FIG. 20 is a side view showing an exemplary configuration of a conventional optical head.
Figure 21:
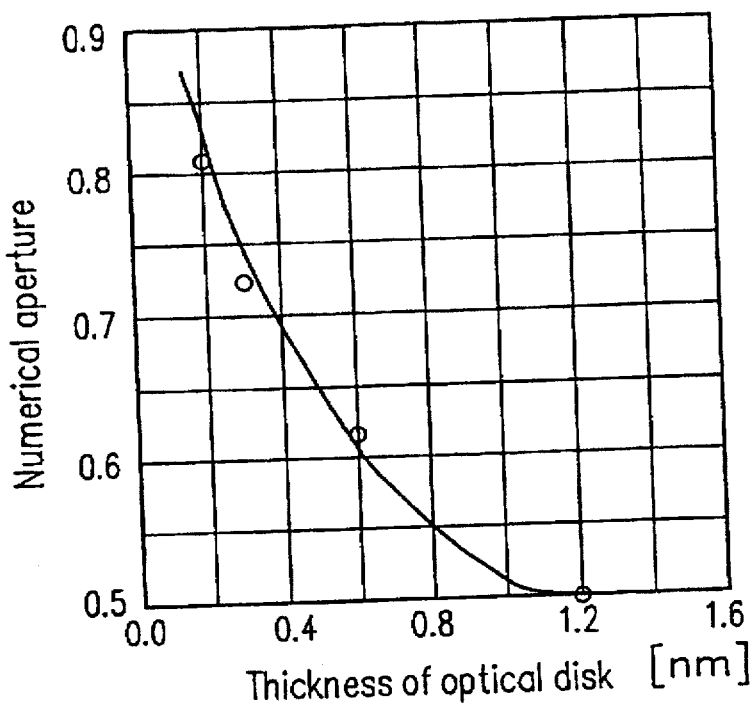
FIG. 21 is a graph showing the relationship between the base material thickness of an optical disk and the numerical aperture of an objective lens.
Figure 22:
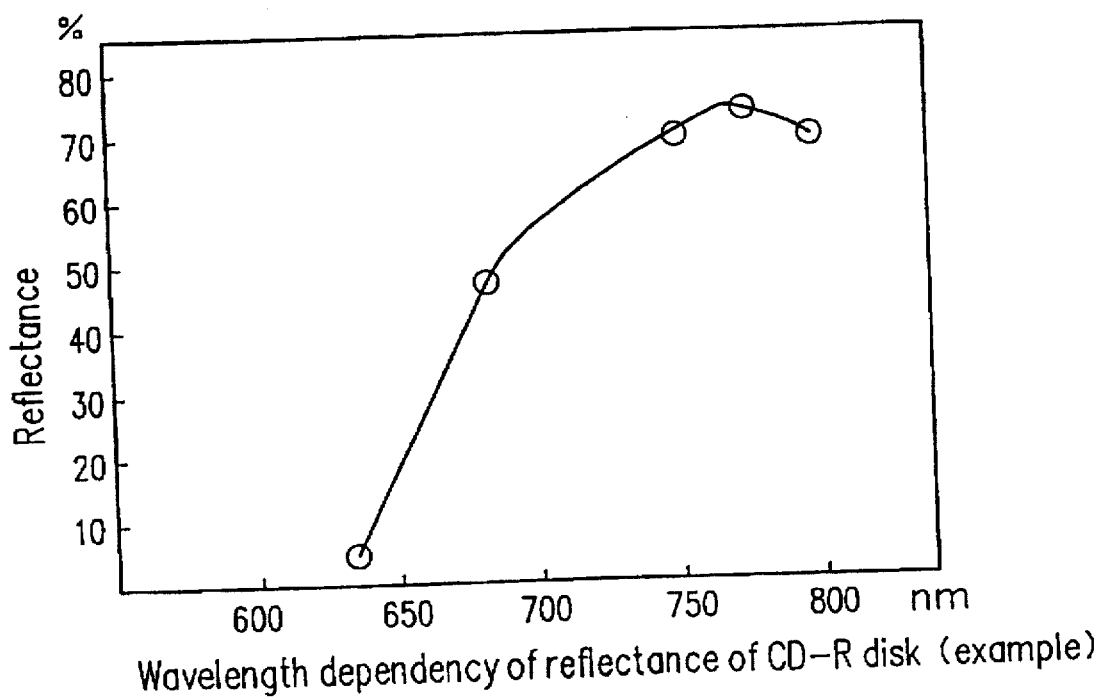
FIG. 22 is a graph showing the wavelength dependency of the reflectance of a CD-R.

In the above-mentioned Examples 4 through 10, the wavelength polarization filter 4a or 4b having the characteristics as shown in FIG. 9A or 9B is employed. However, a wavelength polarization filter having characteristics as shown in FIG. 20A or 20B may be employed depending on the application, and thereby the same effects as discussed in connection with Examples 4 through 10 can also be obtained.

As described hereinbefore, according to the present invention, one optical head includes an LD for each of the first and second optical disks that are different in at least one of the base material thickness and the available wavelength. The LDs are arranged so that the optical path length between a converging optical system designed in accordance with the base material thickness and the available wavelength of the first optical disk and the LD for the second optical disk is different from the optical path length between the converging optical system and the LD for the first optical disk. This makes it possible to perform a recording/reproducing operation for both of the first and second disks by one optical head. Furthermore, each of the LDs has a different oscillation wavelength or is arranged so as to output a light beam of a different polarization direction, which allows the optical path of the light beam output from one of the LDs to be readily combined with or separated from that of the other LD.

Additionally, at least one of the LDs respectively provided for each of the first and second optical disks may be integrated with a photodetector so as to form one unit, whereby the configuration of the optical head can be made more simple.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical head for reproducing data from first and second optical disks which are different from each other in at least one of a base material thickness and an available wavelength, comprising:

a first light source for emitting a first light beam, the first light beam being used for reproducing data from the first optical disk;

an optical system designed to converge the first light beam onto the first optical disk in accordance with a base material thickness and an available wavelength of the first optical disk; and a second light source for emitting a second light beam, the second light beam being used for reproducing data from the second optical disk, wherein an optical path length between the second light source and the optical system is different from an optical path length between the first light source and the optical system, the difference between the optical path length from the first light source to the optical system and the optical path length from the second light source to the optical system compensating a wave-front aberration due to the differences in the at least one of the base material thickness and the available wavelength of the first and the second optical disks.

and wherein the optical system converges the second light beam onto the second optical disk.

2. An optical head according to claim 1, wherein the first optical disk has a first available wavelength and a first base material thickness, and the second optical disk has a second base material thickness, the first base material thickness being less than the second base material thickness, and the optical path length between the second light source and the optical system being less than the optical path length between the first light source and the optical system.

3. An optical head according to claim 1, wherein the first optical disk has a first available wavelength and a first base material thickness, and the second optical disk has a second available wavelength, the first available wavelength being shorter than the second available wavelength, and the optical path length between the second light source and the optical system being less than the optical path length between the first light source and the optical system.

4. An optical head according to claim 2, wherein the second optical disk has a second available wavelength and the first available wavelength is shorter than the second available wavelength.

5. An optical head according to claim 1, wherein the optical path length between the second light source and the optical system is determined in such a manner that a wavefront aberration generated when converging the second light beam onto the second optical disk becomes minimum.

6. An optical head according to claim 1, further comprising combining means for guiding the first and second light beams to the optical system, the combining means being disposed at a position between the optical system and the first light source and between the optical system and the second light source.

7. An optical head according to claim 1, further comprising first detecting means for detecting the first light beam reflected by the first optical disk.

8. An optical head according to claim 7, further comprising second detecting means for detecting the second light beam reflected by the second optical disk.

9. An optical head according to claim 8, wherein the first detecting means is a photodetector provided with a multi-divided detecting face, the photodetector also being used as the second detecting means.

10. An optical head according to claim 8, further comprising separating means for guiding the first light beam reflected by the first optical disk to the first detecting means and for guiding the second light beam reflected by the second optical disk to the second detecting means.

11. An optical head according to claim 10, wherein the separating means is disposed at a position between the optical system and the first light source and between the optical system and the second light source, and guides the first and second light beams to the optical system.

12. An optical head according to claim 1, further comprising optical path length correcting means disposed between the second light source and the optical system.

13. An optical head according to claim 8, wherein the first light source and the first detecting means are integrally provided as a first unit.

14. An optical head according to claim 8, wherein the second light source and the second detecting means are integrally provided as a second unit.

15. An optical head according to claim 6, wherein the first light beam has a first polarization direction and the second light beam has a second polarization direction, and wherein the first and second light sources are positioned so that the first polarization direction is substantially perpendicular to the second polarization direction.

16. An optical head according to claim 15, wherein the combining means transmits one of the first and second light beams and reflects the other in accordance with polarization directions of the first and second light beams, so as to guide the first and second light beams to the optical system.

17. An optical head according to claim 10, wherein the separating means transmits one of the first and second light beams and reflects the other in accordance with polarization directions of the first and second light beams.

18. An optical head according to claim 11, wherein the separating means transmits one of the first and second light beams and reflects the other in accordance with polarization directions of the first and second light beams.

19. An optical head according to claim 6, wherein the combining means transmits one of the first and second light beams and reflects the other in accordance with wavelengths of the first and second light beams, so as to guide the first and second light beams to the optical system.

20. An optical head according to claim 10, wherein the separating means transmits one of the first and second light beams and reflects the other in accordance with wavelengths of the first and second light beams.

21. An optical head according to claim 11, wherein the separating means transmits one of the first and second light beams and reflects the other in accordance with wavelengths of the first and second light beams.

22. An optical head according to claim 16, wherein the combining means transmits one of the first and second light beams and reflects the other in accordance with wavelengths of the first and second light beams, to guide the first and second light beams to the optical system.

23. An optical head according to claim 17, wherein the separating means transmits one of the first and second light beams and reflects the other in accordance with wavelengths of the first and second light beams.

24. An optical head according to claim 18, wherein the separating means transmits one of the first and second light beams and reflects the other in accordance with wavelengths of the first and second light beams.

25. An optical head according to claim 3, further comprising aperture limiting means for limiting a radius of the second light beam.

26. An optical head according to claim 25, further comprising another aperture limiting means for limiting a radius of the first light beam.

27. An optical head according to claim 3, further comprising a wave plate, wherein the first light beam has a first wavelength substantially equal to the first available wavelength of the first optical disk, the second light beam has a second wavelength substantially equal to the second available wavelength of the second optical disk, and the wave plate gives a phase difference of a quarter wavelength to the first light beam and that of a half wavelength to the second light beam.

28. An optical head according to claim 1, wherein the optical system has a collimate lens for substantially collimating the first light beam and an objective lens for converging the collimated first light beam onto the first optical disk.

29. An optical head according to claim 1, wherein the optical system includes an objective lens and a collimate lens.

30. An optical head according to claim 26, wherein the optical system includes an objective lens for converging the first light beam and the second light beam onto the first optical disk and the second optical disk, respectively, and objective lens moving means for moving the objective lens, and wherein the another aperture limiting means is attached to the objective lens moving means.

31. An optical head according to claim 30, wherein the aperture limiting means adjusts the radius of the second light beam to be smaller than the radius of the first light beam adjusted by the another aperture limiting means.

32. An optical head according to claim 13, wherein the first unit further includes first diffraction means for diffracting the first light beam emitted from the first light source so as to generate a plurality of diffracted beams.

33. An optical head according to claim 32, wherein the first diffraction means comprises e diffraction grating having a ring shape.

34. An optical head according to claim 33, wherein the plurality of the diffracted beams include a 0th order diffracted beam and the diffraction grating has a transmittance of the 0th order diffracted beam of 10% or less.

35. An optical head according to claim 34, wherein the first unit further includes means for diffracting the first light beam reflected by the first optical disk, and wherein the reflected first light beam is incident onto the first detecting means without being incident on the diffraction grating having a ring shape.

36. An optical head according to claim 14, wherein the second unit further includes second diffraction means for diffracting the second light beam emitted from the second light source to generate a plurality of diffracted beams.

37. An optical head according to claim 36, wherein the second diffraction means comprises a diffraction grating having a ring shape.

38. An optical head according to claim 37, wherein the plurality of the diffracted beams include a 0th order diffracted beam and the diffraction grating has a transmittance of the 0th order diffracted beam of 10% or less.

39. An optical head according to claim 38, wherein the second unit further includes means for diffracting the second light beam reflected by the second optical disk, and wherein the reflected second light beam is incident onto the second detecting means without being incident on the diffraction grating having a ring shape.

40. An optical head according to claim 1, further comprising:

an aperture limiting means for limiting a diameter of the second light beam so that the diameter of the second light beam is smaller than a diameter of the first light beam.

41. An optical head according to claim 40, wherein the optical system includes an objective lens and a collimate lens, the objective lens being attached to a moveable section which moves together with the objective lens, and wherein the aperture limiting means is attached to the moveable section.

42. An optical data recording and reproducing apparatus comprising an optical head for reproducing data from first and second optical disks which are different from each other in at least one of a base material thickness and an available wavelength, disk discriminating means for discriminating between the first and second optical disks, and drive means for driving the optical head based on a result of the discrimination obtained by the disk discriminating means, the optical head including:

a first light source for emitting a first light beam, the first light beam being used for reproducing data from the first optical disk;

an optical system designed to converge the first light beam onto the first optical disk in accordance with a base material thickness and an available wavelength of the first optical disk; and a second light source for emitting a second light beam, the second light beam being used for reproducing data from the second optical disk, wherein an optical path length between the second light source and the optical system is different from an optical path length between the first light source and the optical system, the difference between the optical path length from the first light source to the optical system and the optical path length from the second light source to the optical system compensating a wave-front aberration due to the differences in the at least one of the base material thickness and the available wavelength of the first and the second optical disks, and the optical system is determined so that the second light beam is converged onto the second optical disk.

* * * * *